United States Patent
Li et al.

(10) Patent No.: US 10,631,327 B2
(45) Date of Patent: Apr. 21, 2020

(54) DOWNLINK CONTROL INFORMATION DETECTION METHOD, DOWNLINK CONTROL INFORMATION SENDING METHOD, AND APPARATUS

(71) Applicant: HUAWEI TECHNOLOGIES CO., LTD., Shenzhen (CN)

(72) Inventors: Chaojun Li, Beijing (CN); Jiafeng Shao, Beijing (CN); Sha Ma, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/052,634

(22) Filed: Aug. 2, 2018

(65) Prior Publication Data
US 2018/0343667 A1 Nov. 29, 2018

Related U.S. Application Data

(63) Continuation of application No. PCT/CN2016/094232, filed on Aug. 9, 2016.

(30) Foreign Application Priority Data

Feb. 2, 2016 (WO) ............... PCT/CN2016/073210

(51) Int. Cl.
*H04L 5/00* (2006.01)
*H04W 48/12* (2009.01)
(Continued)

(52) U.S. Cl.
CPC ....... *H04W 72/1289* (2013.01); *H04L 5/0037* (2013.01); *H04L 5/0053* (2013.01);
(Continued)

(58) Field of Classification Search
CPC ........ H04J 11/0069–0093; H04L 5/003–0098; H04W 28/16–26; H04W 36/0055–0077;
(Continued)

(56) References Cited

U.S. PATENT DOCUMENTS

| | | | |
|---|---|---|---|
| 2013/0044706 A1* | 2/2013 | Suzuki | H04W 72/042 370/329 |
| 2013/0195068 A1* | 8/2013 | Baker | H04L 5/0023 370/330 |

(Continued)

FOREIGN PATENT DOCUMENTS

| | | | |
|---|---|---|---|
| CN | 101699901 A | 4/2010 | |
| CN | 101730985 A * | 6/2010 | ........... H04L 5/0094 |

(Continued)

OTHER PUBLICATIONS

Huawei, HiSilicon, Control signaling enhancements for shortTI[online], 3GPP TSG-RAN WG1#83, 3GPP, Nov. 22, 2015, R1-156461, 6 pages. (Year: 2015).*

(Continued)

*Primary Examiner* — Timothy J Weidner
(74) *Attorney, Agent, or Firm* — Kilpatrick Townsend & Stockton LLP

(57) ABSTRACT

A downlink control information (DCI) detection method is provided, including: determining, by a terminal device, at least one of a first search space and a second search space, where the first search space is in a first time unit of a first time unit set, the second search space is in a second time unit of a second time unit set, the first time unit set and the second time unit set are subsets of the $N_T$ time units included in a time window T, $N_T$ is an integer and $N_T \geq 2$, the first time unit set and the second time unit set overlap; and detecting, by the terminal device, at least one piece of DCI in the at least one search space. According to the foregoing method,
(Continued)

A terminal device determines at least one search space of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit — 101

The terminal device detects at least one piece of downlink control information DCI in the at least one search space — 102 a search space can be flexibly configured and DCI can be flexibly transmitted.

17 Claims, 7 Drawing Sheets

(51) Int. Cl.
| | |
|---|---|
| *H04W 72/04* | (2009.01) |
| *H04W 72/12* | (2009.01) |
| *H04W 74/00* | (2009.01) |
| *H04W 88/06* | (2009.01) |
| *H04W 88/10* | (2009.01) |
| *H04W 92/10* | (2009.01) |

(52) U.S. Cl.
CPC ......... *H04L 5/0078* (2013.01); *H04W 48/12* (2013.01); *H04W 72/0446* (2013.01); *H04W 74/006* (2013.01); *H04W 88/06* (2013.01); *H04W 88/10* (2013.01); *H04W 92/10* (2013.01)

(58) Field of Classification Search
CPC ......... H04W 36/06; H04W 36/34–385; H04W 48/08–16; H04W 72/005–14; H04W 74/002–008; H04W 88/02; H04W 88/06; H04W 88/08–10; H04W 92/04; H04W 92/10
See application file for complete search history.

(56) References Cited

U.S. PATENT DOCUMENTS

2014/0177582 A1* 6/2014 Wu ................... H04L 5/0037 370/329

2016/0014802 A1* 1/2016 Yang ................... H04L 5/001 370/329

FOREIGN PATENT DOCUMENTS

| | | | |
|---|---|---|---|
| CN | 101730985 A | 6/2010 | |
| CN | 102056185 A * | 5/2011 | ........... H04L 1/0038 |
| CN | 102056185 A | 5/2011 | |
| EP | 2590350 A1 | 5/2013 | |
| EP | 2506484 B1 | 1/2015 | |

OTHER PUBLICATIONS

Foreign Communication From a Counterpart Application, PCT Application No. PCT/CN2016/094232, English Translation of International Preliminary Report on Patentability, dated Aug. 7, 2018, 5 pages. (Year: 2018).*

Foreign Communication From a Counterpart Application, European Application No. EP 16 889 027.5, European Search Opinion, dated Sep. 18, 2018, 6 pages. (Year: 2018).*

Foreign Communication From a Counterpart Application, Japanese Application No. JP 2018-558463, English Translation of Notice of Reasons for Refusal, dated May 20, 2019, 3 pages. (Year: 2019).*

Huawei, HiSilicon, Control signaling enhancements for short TTI [online], 3GPP TSG-RAN WG1#83, 3GPP, Nov. 22, 2015, R1-156461, 6 pages.

XP051087705 3GPP TS 36.213 V13.0.1 (Jan. 2016),3rd Generation Partnership Project;Technical Specification Group Radio Access Network;Evolved Universal Terrestrial Radio Access (E-UTRA);Physical layer procedures(Release 13), P7-P224.

* cited by examiner

A terminal device determines at least one search space of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit ~101

The terminal device detects at least one piece of downlink control information DCI in the at least one search space ~102

FIG. 1

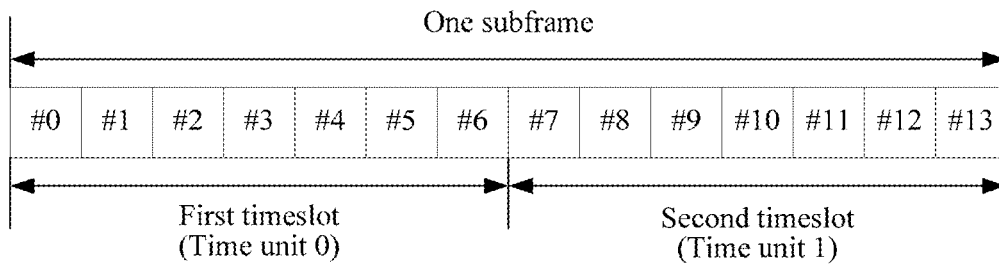

FIG. 2a

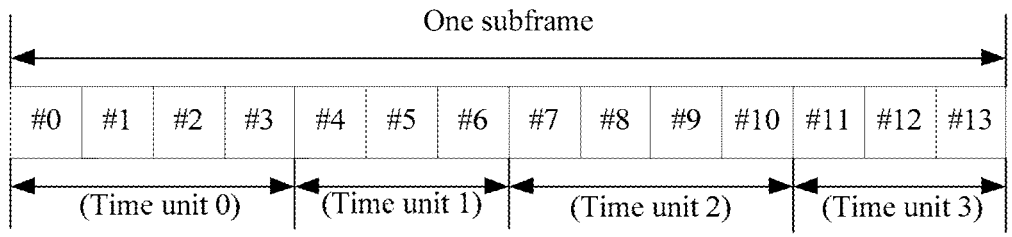

FIG. 2b

S1: First search space
S2: Second search space

DOWNLINK CONTROL INFORMATION DETECTION METHOD, DOWNLINK CONTROL INFORMATION SENDING METHOD, AND APPARATUS

CROSS REFERENCE TO RELATED APPLICATIONS

This application is a continuation of International Application No. PCT/CN2016/094232 filed on Aug. 9, 2016, which claims priority to International Patent Application No. PCT/CN2016/073210, filed on Feb. 2, 2016. The disclosures of the aforementioned applications are hereby incorporated by reference in their entireties.

TECHNICAL FIELD

The present invention relates to the communications field, and in particular, to a downlink control information detection method, a downlink control information sending method, and an apparatus.

BACKGROUND

In a wireless communications system, before receiving downlink data or sending uplink data, a terminal device needs to learn of scheduling information configured by a network device for the terminal device, for example, time-frequency resource allocation and a modulation and coding scheme. In addition, the network device also needs to inform the terminal device of power control command information related to uplink transmission. The scheduling information and the power control command information belong to downlink control information (DCI), that is, the DCI is for scheduling data transmission.

In an Long Term Evolution (LTE) system, a network device carries DCI mainly by using a physical downlink control channel (PDCCH). Currently defined PDCCHs, such as a PDCCH defined in the release Rel-8 and an enhanced PDCCH (EPDCCH) defined in Rel-11, are all used to schedule data transmission having a transmission time interval (TTI) length of 1 ms. However, to match different service requirements or scenario requirements, in the system, data transmission having a plurality of TTI lengths or data transmission having a plurality of scheduling priorities is required. In the prior art, a search space is usually located in the first one, two, three, or four symbols in a downlink subframe, or is located in a symbol area of a PDSCH. Therefore, a search space in an existing LTE system is configured only once in a subframe. For the data transmission having the plurality of TTI lengths or the data transmission having the plurality of scheduling priorities, flexibility of the search space is relatively poor.

SUMMARY

Embodiments of the present invention provide a downlink control information detection method, a downlink control information sending method, and an apparatus, to flexibly configure a search space and flexibly transmit DCI.

According to a first aspect, a downlink control information detection method is provided, including:

determining, by a terminal device, at least one of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit; and detecting, by the terminal device, at least one piece of downlink control information DCI in the at least one search space.

In some embodiments, the at least one search space is the first search space, the at least one piece of downlink control information includes first DCI, and the detecting, by the terminal device, at least one piece of DCI in the at least one search space includes: detecting, by the terminal device, the first DCI in the first search space;

the at least one search space is the second search space, the at least one piece of downlink control information includes second DCI, and the detecting, by the terminal device, at least one piece of DCI in the at least one search space includes: detecting, by the terminal device, the second DCI in the second search space; or the at least one search space includes the first search space and the second search space, the at least one piece of downlink control information includes first DCI and second DCI, and the detecting, by the terminal device, at least one piece of DCI in the at least one search space includes: detecting, by the terminal device, the first DCI in the first search space, and detecting the second DCI in the second search space, where the first DCI is for scheduling first data transmission, the second DCI is for scheduling second data transmission, and a first transmission time interval TTI length for the first data transmission is less than a second transmission time interval TTI length for the second data transmission.

The terminal device can detect at least two types of DCI for scheduling data transmission having different TTI lengths, so that data transmission can be effectively performed between the terminal device and the network device based on the different TTI lengths.

In some embodiments, the downlink control information detection method further includes:

determining, by the terminal device, a third search space, where the third search space is in a third time unit within the time window T, and the third time unit belongs to the second time unit set; and detecting, by the terminal device, third DCI in the third search space, where second DCI detected in the second search space by the terminal device and the third DCI detected in the third search space by the terminal device are both used to schedule the second data transmission.

According to this optional embodiment, because the second DCI and the third DCI are both used to schedule same data transmission, a probability that the second data transmission is successfully scheduled can be increased.

According to a second aspect, a downlink control information sending method is provided, including:

determining, by a network device, at least one of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit; and sending, by the network device, at least one piece of downlink control information DCI, where the at least one piece of DCI is located in the at least one search space.

In some embodiments, the at least one search space is the first search space, and the at least one piece of downlink control information includes first DCI; or the at least one search space is the second search space, and the at least one piece of downlink control information includes second DCI; or the at least one search space includes the first search space and the second search space, and the at least one piece of downlink control information includes first DCI and second DCI, where the first DCI is located in the first search space, the second DCI is located in the second search space, the first DCI is for scheduling first data transmission, the second DCI is for scheduling second data transmission, and a first transmission time interval (TTI) length for the first data transmission is less than a second transmission time interval (TTI) length for the second data transmission.

The network device can send different DCI in different search spaces. The first search space may be located in any time unit in the first time unit set, and the second search space may be located in any time unit in the second time unit set. In this case, whenever the first DCI needs to be sent, the network device can immediately send the first DCI in any time unit in the first time unit set, and whenever the second DCI needs to be sent, the network device can immediately send the second DCI in any time unit in the second time unit set. For example, when the time window T is one subframe, whenever the first DCI needs to be sent, the network device can immediately send the first DCI in any time unit in the first time unit set, and whenever the second DCI needs to be sent, the network device can immediately send the second DCI in any time unit in the second time unit set. This is different from the prior art in which transmission can be performed only in a next subframe.

In some embodiments, the downlink control information sending method further includes:

determining, by the network device, a third search space, where the third search space is in a third time unit within the time window T, and the third time unit belongs to the second time unit set; and sending, by the network device, third DCI in the third search space, where second DCI sent in the second search space by the network device and the third DCI sent in the third search space by the network device are both used to schedule the second data transmission.

In some embodiments, the first search space is a search space detected by a first terminal device, and the second search space is a search space detected by a second terminal device.

In some embodiments, the first search space is located in a first frequency domain resource, where the first frequency domain resource cannot be used for downlink data transmission having the second TTI length.

In some embodiments, the second time unit set is a proper subset of the first time unit set.

According to this optional embodiment, because the second time unit set is the proper subset of the first time unit set, when the first TTI length is less than the second TTI length, the network device may send the second DCI at lower frequency than the first DCI. This can reduce frequency that a terminal device determines the second search space and detects the second DCI, thereby reducing processing complexity.

In some embodiments, the first time unit set and the second time unit set completely overlap, the first TTI length is a length of two symbols, and the second TTI length is a length of four symbols. Because the length of two symbols slightly differs from the length of four symbols, the first time unit set and the second time unit set completely overlap, so that a probability of successful scheduling by using the second DCI is increased. In some embodiments, the second data transmission is uplink data transmission.

In some embodiments, the second time unit set is the proper subset of the first time unit set. The first TTI length is a length of two symbols, and the second TTI length is 0.5 ms or 1 ms. Because the length of two symbols greatly differs from the length of 0.5 ms or 1 ms, the second time unit set is the proper subset of the first time unit set, so that a quantity of blind detection times is reduced. In some embodiments, the second data transmission is downlink data transmission or uplink data transmission.

In some embodiments, $N_T=2$, the first time unit set includes time units 0 and 1, and the second time unit set includes the time unit 0; or $N_T=4$, the first time unit set includes time units 0, 1, 2, and 3, and the second time unit set includes the time unit 0; or $N_T=4$, the first time unit set includes time units 0, 1, 2, and 3, and the second time unit set includes the time units 0 and 2; or $N_T=7$, the first time unit set includes time units 0, 1, 2, 3, 4, 5, and 6, and the second time unit set includes the time unit 0; or $N_T=7$, the first time unit set includes time units 0, 1, 2, 3, 4, 5, and 6, and the second time unit set includes the time units 0 and 3 or includes the time units 0 and 4; or $N_T=7$, the first time unit set includes time units 0, 1, 2, 3, 4, 5, and 6, and the second time unit set includes the time units 0, 2, 3, and 5, or the second time unit set includes the time units 0, 1, 3, and 5, or the second time unit set includes the time units 0, 1, 3, and 4, or the second time unit set includes the time units 0, 2, 4, and 6.

In some embodiments, the time window T is one subframe, and each of the $N_T$ time units includes at least one symbol; and the first TTI length and the second TTI length are two of 1 millisecond, 0.5 millisecond, a length of four symbols, a length of three symbols, a length of two symbols, and a length of one symbol.

In some embodiments, the first time unit is the same as the second time unit, and the first search space and the second search space partially or completely overlap.

In some embodiments, the first time unit set includes a time unit i and a time unit j; and when the first time unit is the time unit i, the first search space occupies M resource elements, and when the first time unit is the time unit j, the first search space occupies N resource elements, where M and N are natural numbers, and M is not equal to N.

In some embodiments, the TTI length for the second data transmission is 1 millisecond, the first search space does not include a candidate control channel belonging to a common search space (CSS), and the second search space includes a candidate control channel belonging to the CSS and a candidate control channel belonging to a specific search space (UESS).

According to a third aspect, a terminal device is provided, including a processor and a transceiver, where the transceiver is in communication connection with the processor;

the processor is configured to determine at least one of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit; and the processor is configured to detect at least one piece of downlink control information DCI in the at least one search space.

In some embodiments, the at least one search space is the first search space, the at least one piece of downlink control information includes first DCI, and that the processor is configured to detect at least one piece of DCI in the at least one search space includes: detecting the first DCI in the first search space; or the at least one search space is the second search space, the at least one piece of downlink control information includes second DCI, and that the processor is configured to detect at least one piece of DCI in the at least one search space includes: detecting the second DCI in the second search space; or the at least one search space includes the first search space and the second search space, the at least one piece of downlink control information includes first DCI and second DCI, and that the processor is configured to detect at least one piece of DCI in the at least one search space includes: detecting the first DCI in the first search space, and detecting the second DCI in the second search space, where the first DCI is for scheduling first data transmission, the second DCI is for scheduling second data transmission, and a first transmission time interval (TTI) length for the first data transmission is less than a second transmission time interval (TTI) length for the second data transmission.

In some embodiments, the terminal device further includes:

the processor is configured to determine a third search space, where the third search space is in a third time unit within the time window T, and the third time unit belongs to the second time unit set; and the processor is configured to detect third DCI in the third search space, where second DCI detected in the second search space by the processor and the third DCI detected in the third search space by the processor are both used to schedule the second data transmission.

According to a fourth aspect, a network device is provided, including a processor and a transceiver, where the transceiver is in communication connection with the processor;

the processor is configured to determine at least one of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit; and the transceiver is configured to send at least one piece of downlink control information DCI, where the at least one piece of DCI is located in the at least one search space.

In some embodiments, the at least one search space is the first search space, and the at least one piece of downlink control information includes first DCI; or the at least one search space is the second search space, and the at least one piece of downlink control information includes second DCI; or the at least one search space includes the first search space and the second search space, and the at least one piece of downlink control information includes first DCI and second DCI, where the first DCI is located in the first search space, the second DCI is located in the second search space, the first DCI is for scheduling first data transmission, the second DCI is for scheduling second data transmission, and a first transmission time interval (TTI) length for the first data transmission is less than a second transmission time interval (TTI) length for the second data transmission.

In some embodiments, the processor is configured to determine a third search space, where the third search space is in a third time unit within the time window T, and the third time unit belongs to the second time unit set; and the processor is configured to send third DCI, where the third DCI is located in the third search space, and the second DCI sent in the second search space by the processor and the third DCI sent in the third search space by the processor are both used to schedule the second data transmission.

In some embodiments, the first search space is a search space detected by a first terminal device, and the second search space is a search space detected by a second terminal device.

In some embodiments, the first search space is located in a first frequency domain resource, where the first frequency domain resource cannot be used for downlink data transmission having the second TTI length.

In some embodiments, the second time unit set is a proper subset of the first time unit set.

In some embodiments, the first time unit set and the second time unit set completely overlap, the first TTI length is a length of two symbols, and the second TTI length is a length of four symbols. Because the length of two symbols slightly differs from the length of four symbols, the first time unit set and the second time unit set completely overlap, so that a probability of successful scheduling by using the second DCI is increased. In some embodiments, the second data transmission is uplink data transmission.

In some embodiments, the second time unit set is the proper subset of the first time unit set. The first TTI length is a length of two symbols, and the second TTI length is 0.5 ms or 1 ms. Because the length of two symbols greatly differs from the length of 0.5 ms or 1 ms, the second time unit set is the proper subset of the first time unit set, so that a quantity of blind detection times is reduced. In some embodiments, the second data transmission is downlink data transmission or uplink data transmission.

In some embodiments, $N_T=2$, the first time unit set includes time units 0 and 1, and the second time unit set includes the time unit 0; or $N_T=4$, the first time unit set includes time units 0, 1, 2, and 3, and the second time unit set includes the time unit 0; or $N_T=4$, the first time unit set includes time units 0, 1, 2, and 3, and the second time unit set includes the time units 0 and 2; or $N_T=7$, the first time unit set includes time units 0, 1, 2, 3, 4, 5, and 6, and the second time unit set includes the time unit 0; or $N_T=7$, the first time unit set includes time units 0, 1, 2, 3, 4, 5, and 6, and the second time unit set includes the time units 0 and 3 or includes the time units 0 and 4; or $N_T=7$, the first time unit set includes time units 0, 1, 2, 3, 4, 5, and 6, and the second time unit set includes the time units 0, 2, 3, and 5, or the second time unit set includes the time units 0, 1, 3, and 5, or the second time unit set includes the time units 0, 1, 3, and 4, or the second time unit set includes the time units 0, 2, 4, and 6.

In some embodiments, the time window T is one subframe, and each of the time units includes at least one symbol; and the first TTI length and the second TTI length are two of 1 millisecond, 0.5 millisecond, a length of four symbols, a length of three symbols, a length of two symbols, and a length of one symbol.

In some embodiments, the first time unit is the same as the second time unit, and the first search space and the second search space partially or completely overlap.

In some embodiments, the first time unit set includes a time unit i and a time unit j; and when the first time unit is the time unit i, the first search space occupies M resource elements, and when the first time unit is the time unit j, the first search space occupies N resource elements, where M and N are natural numbers, and M is not equal to N.

In some embodiments, the TTI length for the second data transmission is 1 millisecond, the first search space does not include a candidate control channel belonging to a common search space (CSS), and the second search space includes a candidate control channel belonging to the CSS and a candidate control channel belonging to a specific search space (UESS).

According to the embodiments of the present invention, the first search space is in the first time unit, the second search space is in the second time unit, and the first time unit and the second time unit respectively belong to the first time unit set and the second time unit set. However, the first time unit set and the second time unit set partially or completely overlap, so that the network device can more flexibly determine the search space, and configure, to different search spaces, DCI used to schedule different data transmission, and correspondingly, the terminal device may detect, in the different search spaces, the DCI used to schedule the different data transmission, to support data transmission having a plurality of TTI lengths or data transmission having a plurality of scheduling priorities.

BRIEF DESCRIPTION OF DRAWINGS

FIG. 1 is a schematic flowchart of a downlink control information detection method according to an embodiment of the present invention;

FIG. 2a and FIG. 2b are schematic diagrams in which one subframe includes a plurality of time units according to an embodiment of the present invention;

DESCRIPTION OF EMBODIMENTS

Figure 3:
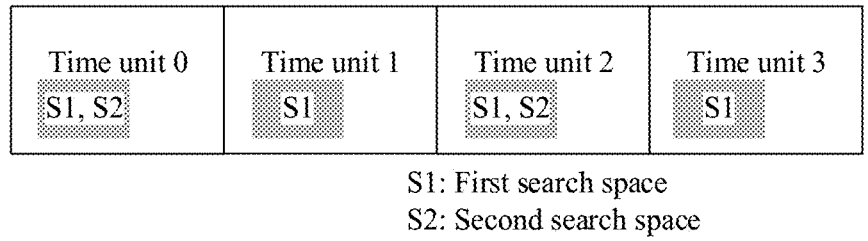
FIG. 3 is a schematic diagram in which a first search space is the same as a second search space according to an embodiment of the present invention.

To facilitate understanding solutions of embodiments of the present invention, basic concepts mentioned in the embodiments of the present invention are first described. It should be noted that, the embodiments of the present invention are described by using an LTE system as an example, but it does not mean that the embodiments of the present invention is applicable only to the LTE system, and in fact, any wireless communications system scheduling data transmission by using DCI can use the technical solutions provided in the embodiments of the present invention. In addition, DCI in the embodiments of the present invention means information used to schedule data transmission, but is not limited to downlink control information in LTE.

1. Frame Structure

A radio frame in the LTE system includes 10 subframes, a length of each subframe is 1 millisecond (ms), each subframe includes two timeslots (slot), and a length of each timeslot is 0.5 ms.

A quantity of symbols included in each timeslot is related to a length of a cyclic prefix (CP) in a subframe. If the CP is a normal CP, each timeslot includes seven symbols, and each subframe includes 14 symbols. For example, each subframe includes symbols whose sequence numbers are #0, #1, #2, #3, #4, #5, #6, #7, #8, #9, #10, #11, #12, and #13, respectively. If the CP is an extended CP, each timeslot includes six symbols, and each subframe includes 12 symbols. For example, each subframe includes symbols whose sequence numbers are #0, #1, #2, #3, #4, #5, #6, #7, #8, #9, #10, and #11, respectively.

In the embodiments of the present invention, both an uplink symbol and a downlink symbol are referred to as a symbol for short. The uplink symbol is a single carrier-frequency division multiple access (SC-FDMA) symbol, and the downlink symbol is an orthogonal frequency division multiplexing (OFDM) symbol. It should be noted that, if an uplink multiple access manner of the orthogonal frequency division multiple access (OFDMA) is introduced into a subsequent technology, the uplink symbol may be another type of symbol, for example, an OFDM symbol. The uplink multiple access manner and a downlink multiple access manner are not limited in the present invention 2. Resource Element A resource element (RE) is a minimum unit in time-frequency domain, and is uniquely identified by an index pair (k, l), where k is a subcarrier index, and l is a symbol index. Certainly, the resource element may alternatively be identified by another form of identifier.

3. Downlink Control Channel and Search Space

The downlink control channel is a channel used to carry DCI, that is, the DCI is carried on the downlink control channel. The downlink control channel may be a PDCCH or an EPDCCH, and a channel that is used to carry the DCI and that is defined in a future version. For example, if a channel carrying DCI is located in a PDSCH area, the channel is also considered as a downlink control channel. For example, if a channel carrying DCI is a PDSCH, the PDSCH is also considered as a downlink control channel.

In some embodiments, the downlink control channel is formed by aggregating L control channel element (CCEs), where L is a positive integer and is referred to as an aggregation level (AL). For example, for the PDCCH, L may be 1, 2, 4, or 8. For another example, for the EPDCCH, L may be 1, 2, 4, 8, 16, or 32. For different types of downlink control channels, quantities of REs included in each of CCEs may be different. This is not limited herein.

The search space includes one or more candidate downlink control channels, and each candidate downlink control channel can be used to carry DCI. Briefly, the search space is a set of the candidate downlink control channels. A terminal device needs to listen on the downlink control channels, and therefore the search space is a set of the candidate downlink control channels on which the terminal device listens. For example, the search space includes one or more PDCCHs, and the search space may be referred to as a PDCCH search space. For example, the search space includes one or more EPDCCHs, and the search space may be referred to as an EPDCCH search space.

The search space includes two types: a common search space (CSS) and a UE specific search space, user equipment specific search space (UESS). The CSS is a search space on which a plurality of terminal devices in a cell need to listen, and the UESS is a search space on which a specific terminal device in a cell needs to listen.

Correspondingly, a PDCCH UESS is a UESS including a PDCCH defined in Rel-8, a PDCCH CSS is a CSS including a PDCCH defined in Rel-8, and an EPDCCH UESS is a UESS including an EPDCCH defined in Rel-11.

4. TTI Length

Currently, various physical channels in the LTE are designed based on a TTI length of 1 ms. It should be noted that, although the TTI length is 1 ms, a time domain resource occupied for data transmission may be less than 1 ms. For example, the first one, two, three, or four symbols in a downlink subframe may be used to transmit a PDCCH, and therefore, a time domain resource occupied for downlink data transmission having the TTI length of 1 ms may be less than 1 ms. For another example, the last symbol in an uplink subframe may be used to transmit an Sounding Reference Signal (SRS), and therefore, a time domain resource occupied for uplink data transmission having the TTI length of 1 ms may also be less than 1 ms.

Short TTI data transmission means that a TTI length for data transmission is less than one subframe or 1 ms. For example, a short TTI length is 0.5 ms, a length of four symbols, a length of three symbols, a length of two symbols, or a length of one symbol. Similarly, a time domain resource occupied for the short TTI data transmission may also be less than the short TTI length.

The following details implementations of the present invention with reference to the accompanying drawings of this specification.

The embodiments of the present invention provide a downlink control information detection method, a downlink control information sending method, and an apparatus, to flexibly configure a search space and flexibly transmit DCI.

The embodiments of the present invention may be applied to a wireless communications system including a network device and a terminal device (or terminal equipment). The terminal device mentioned may be a device that provides a user with voice and/or data connectivity, a handheld device with a wireless connection function, or another processing device connected to a wireless modem. The wireless terminal can communicate with one or more core networks through a radio access network (such as RAN, Radio Access Network). The wireless terminal may be a mobile terminal such as a mobile phone (also referred to as a "cellular" phone), and a computer with a mobile terminal, for example, may be a portable, pocket-sized, handheld, computer built-in, or in-vehicle mobile apparatus, which exchanges voice and/or data with the radio access network. For example, the wireless terminal is a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment). The network device may be a base station, an enhanced base station, a relay having a scheduling function, or a device having a base station function. The base station may be an evolved NodeB (evolved Node B, eNB or e-NodeB) in the LTE system, or may be a base station in another system. This is not limited in the embodiments of the present invention.

FIG. 1 is a schematic flowchart of a downlink control information detection method according to an embodiment of the present invention. The method includes the following steps:

Step 101: A terminal device determines at least one of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit.

Step 102: The terminal device detects at least one piece of DCI in the at least one search space.

The DCI is used to indicate data transmission. In other words, the DCI is for scheduling a data packet. For example, the DCI is for scheduling a PUSCH or a PDSCH. In some embodiments, although the DCI is for scheduling data transmission, the DCI may be only used to indicate scheduling information of the data transmission instead of triggering the data transmission. Therefore, before performing the data transmission, the terminal device needs to detect DCI sent by a network device to the terminal device. However, a downlink control channel carrying the DCI is a candidate downlink control channel in a search space. Therefore, the terminal device needs to determine the search space.

In this embodiment of the present invention, in some embodiments, when there are a variety of DCI used to schedule data transmission having a plurality of TTI lengths, a plurality of search spaces may be determined.

In an embodiment, the at least one search space is the first search space, and the at least one piece of DCI includes first DCI. In this case, if the network device sends the first DCI, the first DCI is located in the first search space. To be specific, the first DCI is carried on a candidate downlink control channel in the first search space, and the first DCI is for scheduling first data transmission. The first data transmission is downlink data transmission or uplink data transmission.

In another embodiment, the at least one search space is the second search space, and the at least one piece of DCI includes second DCI. In this case, if the network device sends the second DCI, the second DCI is located in the second search space. To be specific, the second DCI is carried on a candidate downlink control channel in the second search space, and the second DCI is for scheduling second data transmission. The second data transmission is downlink data transmission or uplink data transmission.

In still another embodiment, the at least one search space includes the first search space and the second search space, and the at least one piece of DCI includes first DCI and second DCI. In this case, if the network device sends the first DCI, the first DCI is located in the first search space, and if the network device sends the second DCI, the second DCI is located in the second search space. The first DCI is for scheduling first data transmission, and the second DCI is for scheduling second data transmission. Both the first and the second data transmission are downlink data transmission or uplink data transmission, the first data transmission is downlink data transmission and the second data transmission is uplink data transmission, or the first data transmission is uplink data transmission and the second data transmission is downlink data transmission. It should be noted that there is no strict time sequence relationship between determining the first search space and determining the second search space by the terminal device. For example, the terminal device may first determine the first search space, and then determine the second search space; first determine the second search space, and then determine the first search space; or determine the first search space and the second search space at the same time.

In some embodiments, the foregoing downlink data transmission may be PDSCH transmission, and the uplink data transmission may be PUSCH transmission.

In some embodiments, a first TTI length is less than a second TTI length. The first TTI length is a TTI length for the first data transmission, and the second TTI length is a TTI length for the second data transmission. Briefly, the first TTI length for the first data transmission is less than the second TTI length for the second data transmission.

In some embodiments, the first TTI length and the second TTI length are two of 1 ms, 0.5 ms, a length of four symbols, a length of three symbols, a length of two symbols, and a length of one symbol. The first TTI length is less than the second TTI length. For example, the first TTI length is a short TTI length, and the second TTI length is one subframe or 1 ms.

In this embodiment of the present invention, the time window T includes $N_T$ time units that may be recorded as a time unit $0, \ldots,$ and a time unit $N_T-1$, where $N_T$ is an integer greater than or equal to 2. Certainly, the $N_T$ time units may alternatively be recorded as a time unit $1, \ldots,$ and a time unit $N_T$, or may be recorded in another form. This is not limited in the present invention. This embodiment of the present invention is described by using the time unit $0, \ldots,$ and the time unit $N_T-1$ as an example. The time window T represents a period of time having a time length of T. For example, the time window T is one subframe or 1 ms. The time window T may alternatively be any other suitable time length. For example, the time window T is greater than or less than 1 ms.

In this embodiment of the present invention, the first time unit set and the second time unit set are subsets of the $N_T$ time units. For example, the first time unit set includes the $N_T$ time units, or includes some of the $N_T$ time units. For example, the second time unit set includes the $N_T$ time units, or includes some of the $N_T$ time units. In some embodiments, the first time unit set includes X time units, where X is an integer not less than 2. For example, the time window T is one subframe and includes 14 symbols, the first TTI length is the length of two symbols, and a quantity of time units included in the first time unit set is 7, 6, or 5. For example, the time window T is one subframe and includes 14 symbols, the first TTI length is the length of four or three symbols, and a quantity of time units included in the first time unit set is 4. Because the first search space may be located in any time unit in the first time unit set, whenever the first DCI needs to be sent, the network device can immediately send the first DCI in any time unit in the first time unit set. This is different from the prior art in which transmission can be performed only in a next subframe. In this way, a data transmission scheduling delay is effectively reduced. In some embodiments, the second time unit set includes Y time units, where Y is a positive integer less than or equal to X. The first time unit set and the second time unit set partially or completely overlap. The first time unit is the same as or different from the second time unit.

In this embodiment of the present invention, in some embodiments, the second time unit set is a proper subset of the first time unit set. For example, when the second TTI length is greater than the first TTI length, the network device may send the second DCI at lower frequency than the first DCI. Therefore, according to the method, frequency that the terminal device determines the second search space and detects the second DCI can be reduced, thereby reducing processing complexity.

For example, $N_T$ is equal to 2, that is, one time window T includes a total of two time units: time units 0 and 1, the first time unit set includes the time units 0 and 1, and the second time unit set includes the time unit 0. In this case, the first time unit set and the second time unit set partially overlap. In addition, the second time unit set is the proper subset of the first time unit set. The first time unit may be the time unit 0 or the time unit 1 in the first time unit set, the first search space is in the time unit 0 or in the time unit 1, the second time unit may be the time unit 0 in the second time unit set, and the second search space is in the time unit 0.

In this embodiment of the present invention, in some embodiments, the first time unit set and the second time unit set completely overlap. Although the network device may send the second DCI at lower frequency than the first DCI, a chance of sending the second DCI can be increased according to the method, so that the network device can more flexibly configure and send the second DCI, thereby increasing a probability of successful scheduling by using the second DCI.

For example, the first time unit set and the second time unit set completely overlap, the first TTI length is the length of two symbols, and the second TTI length is the length of four symbols. Because the length of two symbols slightly differs from the length of four symbols, the first time unit set and the second time unit set completely overlap, so that a probability of successful scheduling by using the second DCI is increased. In some embodiments, the second data transmission is uplink data transmission.

For example, the second time unit set is the proper subset of the first time unit set, the first TTI length is the length of two symbols, and the second TTI length is 0.5 ms or 1 ms.

Because the length of two symbols greatly differs from the length of 0.5 ms or 1 ms, the second time unit set is the proper subset of the first time unit set, so that a quantity of blind detection times is reduced. In some embodiments, the second data transmission is downlink data transmission or uplink data transmission.

For example, $N_T$ is equal to 2, that is, one time window T includes a total of two time units: time units 0 and 1, the first time unit set includes the time units 0 and 1, and the second time unit set includes the time units 0 and 1. In this case, the first time unit set and the second time unit set completely overlap. The first time unit may be the time unit 0 or the time unit 1 in the first time unit set, the first search space is in the time unit 0 or in the time unit 1, the second time unit may be the time unit 0 or the time unit 1 in the second time unit set, and the second search space is in the time unit 0 or in the time unit 1.

In some embodiments, before the terminal device determines the at least one search space of the first search space and the second search space, this embodiment of the present invention may further include: determining, by the terminal device, the first time unit set and/or the second time unit set based on signaling received from the network device. The signaling may be higher layer signaling or physical layer signaling. In this way, the network device can adjust sizes/a size of the first time unit set and/or the second time unit set in a timely manner based on statuses such as current load. When the first time unit set and/or the second time unit set notified by the network device are/is relatively small, the terminal device may reduce a quantity of search space determining times and a quantity of DCI detection times.

In some embodiments, the step of determining, by a terminal device, at least one of a first search space and a second search space may include: obtaining, by the terminal device, the first time unit based on signaling received from the network device, and determining the first search space in the first time unit; obtaining, by the terminal device, the second time unit based on signaling received from the network device, and determining the second search space in the second time unit; or obtaining, by the terminal device, the first and the second time units based on signaling received from the network device, and determining the first search space in the first time unit and the second search space in the second time unit. The signaling may be higher layer signaling or physical layer signaling.

In some embodiments, the determining, by a terminal device, at least one of a first search space and a second search space may be performed in the following operations. Within the time window T, the terminal device determines, one by one in a sequence from the time unit 0 to the time unit $N_T-1$, at least one of the first search space and the second search space in the time units. Specifically, if a time unit k within the time window T belongs to the first time unit set, the terminal device determines the first search space in the time unit k; and/or, if the time unit k belongs to the second time unit set, determines the second search space in the time unit k, where k is an integer that is greater than or equal to 0 and that is less than $N_T$. For example, $N_T$ is equal to 2, the first time unit set includes time units 0 and 1, and the second time unit set includes the time unit 0. In this case, the time unit 0 belongs to the first time unit set and the second time unit set, so that the terminal device determines the first search space and the second search space in the time unit 0, and the terminal device may detect DCI in the determined first search space and second search space; the time unit 1 belongs to the first time unit set but does not belong to the second time unit set, so that the terminal device determines only the first search space in the time unit 1, and the terminal device may detect DCI in the determined first search space.

In some embodiments, the determining, by a terminal device, at least one of a first search space and a second search space may be performed in the following operations. The terminal device determines the first search space in a time unit in the first time unit set, and determines the second search space in a time unit in the second time unit set. For example, $N_T$ is equal to 2, the first time unit set includes time units 0 and 1, and the second time unit set includes the time unit 0. In this case, the terminal device determines the first search space separately in the time units 0 and 1, and determines the second search space in the time unit 0. The terminal device may detect the first DCI in the first search space, and detect the second DCI in the second search space.

The following describes this embodiment of the present invention by using an example in which the time window T is one subframe or 1 ms, but it does not mean that the time window T in this embodiment of the present invention can only be one subframe or 1 ms. In fact, the time window T in this embodiment of the present invention may be any proper time length.

In some embodiments, when $N_T$ is equal to 2, two time units included in one subframe are the time units 0 and 1. The time unit 0 is located in a first timeslot of the subframe, time unit 1 is located in a second timeslot of the subframe, and both the time units 0 and 1 are 0.5 ms. Therefore, for a normal CP, as shown in FIG. 2a, the time unit 0 is located in a symbol set {#0, #1, #2, #3, #4, #5, #6}, and the time unit 1 is located in a symbol set {#7, #8, #9, #10, #11, #12, #13}; for an extended CP, the time unit 0 is located in a symbol set {#0, #1, #2, #3, #4, #5}, and the time unit 1 is located in a symbol set {#6, #7, #8, #9, #10, #11}.

When $N_T$ is equal to 2, two groups of optional combinations of the first time unit set and the second time unit set are described in Table 1. For example, the first time unit set includes time units 0 and 1, and the second time unit set includes the time unit 0. For another example, the first time unit set includes the time units 0 and 1, and the second time unit set includes the time units 0 and 1. The first TTI length is 0.5 ms, and the second TTI length is 1 ms. It should be noted that any combination of the first time unit set and the second time unit set described in Table 1 may be used as a separate embodiment. It should be noted that a combination of the first time unit set and the second time unit set is not limited to manners in Table 1, and may alternatively be in another manner.

TABLE 1

| $N_T$ | First time unit set | Second time unit set |
|---|---|---|
| 2 | {0, 1} | {0} |
|  | {0, 1} | {0, 1} |

In some embodiments, when $N_T$ is equal to 4, four time units included in one subframe are time units 0, 1, 2, and 3. A time length of any of the four time units may be the length of three or four symbols. In some embodiments, for the normal CP, a time unit may be divided based on either of the following two structures. Structure 1: As shown in FIG. 2b, the time unit 0 is located in a symbol set {#0, #1, #2, #3}, the time unit 1 is located in a symbol set {#4, #5, #6}, the time unit 2 is located in a symbol set {#7, #8, #9, #10}, and the time unit 3 is located in a symbol set {#11, #12, #13}. Structure 2: The time unit 0 is located in a symbol set {#0, #1, #2}, the time unit 1 is located in a symbol set {#3, #4,

5, #6}, the time unit 2 is located in a symbol set {#7, #8, #9}, and the time unit 3 is located in a symbol set {#10, #11, #12, #13}. In some embodiments, for the extended CP, every three consecutive symbols form a time unit. To be specific, the time unit 0 is located in a symbol set {#0, #1, #2}, the time unit 1 is located in a symbol set {#3, #4, #5}, the time unit 2 is located in a symbol set {#6, #7, #8}, and the time unit 3 is located in a symbol set {#9, #10, #11}. It should be noted that, any two time lengths of the $N_T$ time units within the time window T may be different. For example, for the structure 1 and the structure 2, a time length of a time unit in a time unit set may be the length of three or four symbols.

When $N_T$ is equal to 4, five groups of optional combinations of the first time unit set and the second time unit set are described in Table 2. For example, the first time unit set includes the time units 0, 1, 2, and 3, the second time unit set includes the time unit 0, or the second time unit set includes the time units 0 and 2, or the second time unit set includes the time units 0, 1, 2, and 3; the first time unit set includes the time units 0 and 2, and the second time unit set includes the time unit 0, or the second time unit set includes the time units 0 and 2. It should be noted that any combination of the first time unit set and the second time unit set described in Table 2 may be used as a separate embodiment. It should be noted that a combination of the first time unit set and the second time unit set is not limited to manners in Table 2, and may alternatively be in another manner.

TABLE 2

| First $N_T$ time unit set | Second time unit set | First TTI length | Second TTI length |
|---|---|---|---|
| 4 {0, 1, 2, 3} | {0} | Four or three symbols | 1 ms |
| {0, 1, 2, 3} | {0, 2} | Four or three symbols | 0.5 ms or 1 ms |
| {0, 2} | {0} | 0.5 ms | 1 ms |
| {0, 2} | {0, 2} | 0.5 ms | 1 ms |
| {0, 1, 2, 3} | {0, 1, 2, 3} | Four or three symbols | 0.5 ms or 1 ms |

In some embodiments, when $N_T$ is equal to 7 or 14, one subframe includes time units 0, 1, 2, 3, 4, 5, and 6, or includes time units 0, 1, 2, 3, 4, 5, 6, 7, 8, 9, 10, 11, 12, and 13. Therefore, for the normal CP, every two symbols are a time unit, or each symbol is a time unit.

In some embodiments, when $N_T$ is equal to 6 or 12, one subframe includes time units 0, 1, 2, 3, 4, and 5, or includes time units 0, 1, 2, 3, 4, 5, 6, 7, 8, 9, 10, and 11. Therefore, for the extended CP, every two symbols are a time unit, or each symbol is a time unit.

In some embodiments, for the normal CP, when $N_T$ is equal to 6, one subframe includes the time unit 0, 1, 2, 3, 4, and 5. In some embodiments, the time unit 0 is located in a symbol set {#0, #1, #2}, the time unit 1 is located in a symbol set {#3, #4}, the time unit 2 is located in a symbol set {#5, #6}, the time unit 3 is located in a symbol set {#7, #8, #9}, the time unit 4 is located in a symbol set {#10, #11}, and the time unit 5 is located in a symbol set {#12, #13}. It should be noted that a division manner of the six time units is not limited in the present invention.

In some embodiments, time unit division may not be performed on a PDCCH symbol. In this case, time unit division may not be performed on the first one, two, or three PDCCH symbols of a subframe. In some embodiments, the first one symbol of a subframe is a PDCCH symbol. For the normal CP, when $N_T$ is equal to 6, the time unit 0 is located in a symbol set {#1, #2, #3}, the time unit 1 is located in a symbol set {#4, #5}, the time unit 2 is located in a symbol set {#6, #7}, the time unit 3 is located in a symbol set {#8, #9}, the time unit 4 is located in a symbol set {#10, #11}, and the time unit 5 is located in a symbol set {#12, #13}. In some embodiments, the first two symbols of a subframe are PDCCH symbols. For the normal CP, when $N_T$ is equal to 6, the time unit 0 is located in a symbol set {#2, #3}, the time unit 1 is located in a symbol set {#4, #5}, the time unit 2 is located in a symbol set {#6, #7}, the time unit 3 is located in a symbol set {#8, #9}, the time unit 4 is located in a symbol set {#10, #11}, and the time unit 5 is located in a symbol set {#12, #13}.

When $N_T$ is equal to 6, 7, 12, or 14, a plurality of groups of optional combinations of the first time unit set and the second time unit set are described in Table 3. In some embodiments, when the first two or three symbols of a subframe are PDCCH symbols, the first data transmission is downlink data transmission. Moreover, when the first TTI length is the length of two symbols, because no downlink data transmission occurs in the time unit 0, the first DCI used to schedule the first data transmission in the time unit 1 may be located in the time unit 0, that is, there may be no first search space in the time unit 1. Therefore, for the normal CP, the first time unit set may be {0, 2, 3, 4, 5, 6} or {0, 4, 6, 8, 10, 12}; for the extended CP, the first time unit set may be {0, 2, 3, 4, 5} or {0, 4, 6, 8, 10}. It should be noted that any combination of the first time unit set and the second time unit set described in Table 3 may be used as a separate embodiment. It should be noted that a combination of the first time unit set and the second time unit set is not limited to manners in Table 3, and may alternatively be in another manner.

In some embodiments, the first time unit set and the second time unit set may not include a time unit 0, and the time unit 0 includes a symbol #0 and a symbol #1. For example, $N_T$ is equal to 7, PDCCHs on the first two PDCCH symbols of a subframe are used to schedule only data transmission having 1 ms, and in this case, are not used to schedule data transmission having a short TTI.

TABLE 3

| $N_T$ | First time unit set | Second time unit set | First TTI length | Second TTI length |
|---|---|---|---|---|
| 6 | {0, 1, 2, 3, 4, 5} or {0, 2, 3, 4, 5} | {0} | Two symbols | 1 ms |
| | {0, 1, 2, 3, 4, 5} or {0, 2, 3, 4, 5} | {0, 3} | Two symbols | 0.5 ms or 1 ms |
| | {0, 1, 2, 3, 4, 5} or {0, 2 3, 4, 5} | {0, 1, 3, 4}, {0, 2, 3, 5}, {0, 2, 3, 4}, or {0, 1, 3, 5} | Two symbols | Four or three symbols, 0.5 ms, or 1 ms |
| | {0, 1, 3, 4}, {0, 2, 3, 5}, {0, 2, 3, 4}, or {0, 1, 3, 5} | {0} | Four or three symbols | 1 ms |

TABLE 3-continued

| $N_T$ | First time unit set | Second time unit set | First TTI length | Second TTI length |
|---|---|---|---|---|
| | {0, 1, 3, 4}, {0, 2, 3, 5}, {0, 2, 3, 4}, or {0, 1, 3, 5} | {0, 3} | Four or three symbols | 0.5 ms or 1 ms |
| | {0, 3} | {0} | 0.5 ms | 1 ms |
| | {0, 3} | {0, 3} | 0.5 ms | 1 ms |
| | {0, 1, 3, 4}, {0, 2, 3, 5}, {0, 2, 3, 4}, or {0, 1, 3, 5} | {0, 1, 3, 4}, {0, 2, 3, 5}, {0, 2, 3, 4}, or {0, 1, 3, 5} | Four or three symbols | 0.5 ms or 1 ms |
| | {0, 1, 2, 3, 4, 5} or {0, 2, 3, 4, 5} | {0, 1, 2, 3, 4, 5} or {0, 2, 3, 4, 5} | Two symbols | Four or three symbols, 0.5 ms, or 1 ms |
| 7 | {0, 1, 2, 3, 4, 5, 6} or {0, 2, 3, 4, 5, 6} | {0} | Two symbols | 1 ms |
| | {0, 1, 2, 3, 4, 5, 6} or {0, 2, 3, 4, 5, 6} | {0, 3} or {0, 4} | Two symbols | 0.5 ms or 1 ms |
| | {0, 1, 2, 3, 4, 5, 6} or {0, 2, 3, 4, 5, 6} | {0, 2, 3, 5}, or {0, 1, 3, 5}, or {0, 1, 3, 4}, or {0, 2, 4, 6}, or {0, 2, 4, 5} | Two symbols | Four or three symbols, 0.5 ms, or 1 ms |
| | {0, 2, 3, 5} or {0, 1, 3, 5} or {0, 1, 3, 4} or {0, 2, 4, 6} or {0, 2, 4, 5} | {0} | Four or three symbols | 1 ms |
| | {0, 2, 3, 5} or {0, 1, 3, 5} or {0, 1, 3, 4} or {0, 2, 4, 6} or {0, 2, 4, 5} | {0, 3} or {0, 4} | Four or three symbols | 0.5 ms or 1 ms |
| | {0, 3} or {0, 4} | {0} | 0.5 ms | 1 ms |
| | {0, 3} or {0, 4} | {0, 3} or {0, 4} | 0.5 ms | 1 ms |
| | {0, 2, 3, 5} or {0, 1, 3, 5} or {0, 1, 3, 4} or {0, 2, 4, 6} or {0, 2, 4, 5} | {0, 2, 3, 5}, or {0, 1, 3, 5}, or {0, 1, 3, 4}, or {0, 2, 4, 6}, or {0, 2, 4, 5} | Four or three symbols | 0.5 ms or 1 ms |
| | {0, 1, 2, 3, 4, 5, 6} or {0, 2, 3, 4, 5, 6} | {0, 1, 2, 3, 4, 5, 6} or {0, 2, 3, 4, 5, 6} | Two symbols | Four or three symbols, 0.5 ms, or 1 ms |
| | {1, 2, 3, 4, 5, 6} | {1, 3} or {1, 4} | Two symbols | 0.5 ms |
| | {1, 2, 3, 4, 5, 6} | {1, 2, 3, 5}, {1, 2, 4 6}, or {1, 2, 4, 5} | Two symbols | Four or three symbols |
| | {1, 2, 3, 4, 5, 6} | {1, 2, 3, 4, 5, 6} | Two symbols | 0.5 ms or four or three symbols |
| 12 | {0, 1, 2, 3, 4, 5, 6, 7, 8, 9, 10, 11} | {0} | One symbol | 1 ms |
| | {0, 1, 2, 3, 4, 5, 6, 7, 8, 9, 10, 11} | {0, 6} | One symbol | 0.5 ms or 1 ms |
| | {0, 1, 2, 3, 4, 5, 6, 7, 8, 9, 10, 11} | {0, 3, 6, 9} or {0, 2, 6, 8} | One symbol | Four or three symbols, 0.5 ms, or 1 ms |
| | {0, 1, 2, 3, 4, 5, 6, 7, 8, 9, 10, 11} | {0, 2, 4, 6, 8, 10} or {0, 4, 6, 8, 10} | One symbol | Two symbols, four or three symbols, 0.5 ms, or 1 ms |
| | {0, 2, 4, 6, 8, 10} or {0, 4, 6, 8, 10} | {0} | Two symbols | 1 ms |
| | {0, 2, 4, 6, 8, 10} or {0, 4, 6, 8, 10} | {0, 6} | Two symbols | 0.5 ms or 1 ms |
| | {0, 2, 4, 6, 8, 10} or {0, 4, 6, 8, 10} | {0, 2, 6, 8}, {0, 4, 6, 10}, {0, 4, 6, 8}, or {0, 2, 6, 10} | Two symbols | Four or three symbols, 0.5 ms, or 1 ms |
| | {0, 2, 6, 8}, {0, 4, 6, 10}, {0, 4, 6, 8}, or {0, 2, 6, 10} | {0} | Four or three symbols | 1 ms |
| | {0, 2, 6, 8}, {0, 4, 6, 10}, {0, 4, 6, 8}, or {0, 2, 6, 10} | {0, 6} | Four or three symbols | 0.5 ms or 1 ms |
| | {0, 6} | {0} | 0.5 ms | 1 ms |
| | {0, 6} | {0, 6} | 0.5 ms | 1 ms |
| | {0, 2, 6, 8}, {0, 4, 6, 10}, {0, 4, 6, 8}, or {0, 2, 6, 10} | {0, 2, 6, 8}, {0, 4, 6, 10}, {0, 4, 6, 8}, or {0, 2, 6, 10} | Four or three symbols | 0.5 ms or 1 ms |
| | {0, 2, 4, 6, 8, 10} or {0, 4, 6, 8, 10} | {0, 2, 4, 6, 8, 10} or {0, 4, 6, 8, 10} | Two symbols | Four or three symbols, 0.5 ms, or 1 ms |
| | {0, 1, 2, 3, 4, 5, 6, 7, 8, 9, 10, 11} | {0, 1, 2, 3, 4, 5, 6, 7, 8, 9, 10, 11} | One symbol | Two symbols, four or three symbols, 0.5 ms, or 1 ms |
| 14 | {0, 1, 2, 3, 4, 5, 6, 7, 8, 9, 10, 11, 12, 13} | {0} | One symbol | 1 ms |
| | {0, 1, 2, 3, 4, 5, 6, 7, 8, 9, 10, 11, 12, 13} | {0, 7} | One symbol | 0.5 ms or 1 ms |

TABLE 3-continued

| $N_T$ First time unit set | Second time unit set | First TTI length | Second TTI length |
|---|---|---|---|
| {0, 1, 2, 3, 4, 5, 6, 7, 8, 9, 10, 11, 12, 13} | {0, 3, 7, 10}, {0, 3, 7, 11}, {0, 4, 7, 11}, or {0, 4, 7, 10} | One symbol | Four or three symbols, 0.5 ms, or 1 ms |
| {0, 1, 2, 3, 4, 5, 6, 7, 8, 9, 10, 11, 12, 13} | {0, 2, 4, 6, 8, 10, 12} or {0, 4, 6, 8, 10, 12} | One symbol | Two symbols, four or three symbols, 0.5 ms, or 1 ms |
| {0, 2, 4, 6, 8, 10, 12} or {0, 4, 6, 8, 10, 12} | {0} | Two symbols | 1 ms |
| {0, 2, 4, 6, 8, 10, 12} or {0, 4, 6, 8, 10, 12} | {0, 7}, {0, 6}, or {0, 8} | Two symbols | 0.5 ms or 1 ms |
| {0, 2, 4, 6, 8, 10, 12} or {0, 4, 6, 8, 10, 12} | {0, 4, 6, 10}, {0, 2, 6, 10}, {0, 2, 6, 8}, {0, 4, 8, 12}, {0, 2, 8, 10}, {0, 4, 8, 10}, {0, 3, 7, 10}, {0, 3, 7, 11}, {0, 4, 7, 11}, or {0, 4, 7, 10} | Two symbols | Four or three symbols, 0.5 ms, or 1 ms |
| {0, 4, 6, 10}, {0, 2, 6, 10}, {0, 2, 6, 8}, {0, 4, 8, 12}, {0, 2, 8, 10}, {0, 4, 8, 10}, {0, 3, 7, 10}, {0, 3, 7, 11}, {0, 4, 7, 11}, or {0, 4, 7, 10} | {0} | Four or three symbols | 1 ms |
| {0, 4, 6, 10}, {0, 2, 6, 10}, {0, 2, 6, 8}, {0, 4, 8, 12}, {0, 2, 8, 10}, {0, 4, 8, 10}, {0, 3, 7, 10}, {0, 3, 7, 11}, {0, 4, 7, 11}, or {0, 4, 7, 10} | {0, 7}, {0, 6}, or {0, 8} | Four or three symbols | 0.5 ms or 1 ms |
| {0, 7}, {0, 6}, or {0, 8} | {0} | 0.5 ms | 1 ms |
| {0, 7}, {0, 6}, or {0, 8} | {0, 7}, {0, 6}, or {0, 8} | 0.5 ms | 1 ms |
| {0, 4, 6, 10}, {0, 2, 6, 10}, {0, 2, 6, 8}, {0, 4, 8, 12}, {0, 2, 8, 10}, {0, 4, 8, 10}, {0, 3, 7, 10}, {0, 3, 7, 11}, {0, 4, 7, 11}, or {0, 4, 7, 10} | {0, 4, 6, 10}, {0, 2, 6, 10}, {0, 2, 6, 8}, {0, 4, 8, 12}, {0, 2, 8, 10}, {0, 4, 8, 10}, {0, 3, 7, 10}, {0, 3, 7, 11}, {0, 4, 7, 11}, or {0, 4, 7, 10} | Four or three symbols | 0.5 ms or 1 ms |
| {0, 2, 4, 6, 8, 10, 12} or {0, 4, 6, 8, 10, 12} | {0, 2, 4, 6, 8, 10, 12} or {0, 4, 6, 8, 10, 12} | Two symbols | Four or three symbols, 0.5 ms, or 1 ms |
| {0, 1, 2, 3, 4, 5, 6, 7, 8, 9, 10, 11, 12, 13} | {0, 1, 2, 3, 4, 5, 6, 7, 8, 9, 10, 11, 12, 13} | One symbol | Two symbols, four or three symbols, 0.5 ms, or 1 ms |

In some embodiments, the first one, two, three, or four symbols of a subframe may be used to transmit a PDCCH (which are referred to as a PDCCH symbol), but are not used for downlink data transmission. Therefore, a time unit may be divided based on a quantity of PDCCH symbols. Certainly, the first one, two, three, or four symbols of a subframe may alternatively not be used to transmit a PDCCH.

For example, the first one, two, or three symbols of a subframe are PDCCH symbols. For the normal CP, when $N_T$ is equal to 6, the first four symbols form a time unit 0, and every two of the following 10 symbols form a time unit, so that time units 1, 2, 3, 4, and 5 are obtained through sorting in sequence; or for the extended CP, when $N_T$ is equal to 5, the first four symbols form a time unit 0, and every two of the following eight symbols form a time unit, so that time units 1, 2, 3, and 4 are obtained through sorting in sequence. A plurality of optional combinations are described in Table 4, and any combination described in Table 4 may be used as a separate embodiment. It should be noted that a combination of the first time unit set and the second time unit set is not limited to manners in Table 4, and may alternatively be in another manner.

In some embodiments, for the normal CP, the first three symbols of a subframe are PDCCH symbols. When $N_T$ is equal to 5, the time unit 0 is located in a symbol set {#3, #4, #5}, the time unit 1 is located in a symbol set {#6, #7}, the time unit 2 is located in a symbol set {#8, #9}, the time unit 3 is located in a symbol set {#10, #11}, and the time unit 4 is located in a symbol set {#12, #13}.

TABLE 4

| $N_T$ | First time unit set | Second time unit set | First TTI length | Second TTI length |
|---|---|---|---|---|
| 6 | {0, 1, 2, 3, 4, 5} | {0} | Two symbols | 1 ms |
|  | {0, 1, 2, 3, 4, 5} | {0, 2} or {0, 3} | Two symbols | 0.5 ms or 1 ms |
|  | {0, 1, 2, 3, 4, 5} | {0, 1, 2, 4} or {0, 1, 3, 4} | Two symbols | Four or three symbols, 0.5 ms, or 1 ms |
|  | {0, 1, 2, 4} or {0, 1, 3, 4} | {0} | Four or three symbols | 1 ms |
|  | {0, 1, 2, 4} or {0, 1, 3, 4} | {0, 2} or {0, 3} | Four or three symbols | 0.5 ms or 1 ms |

TABLE 4-continued

| $N_T$ | First time unit set | Second time unit set | First TTI length | Second TTI length |
|---|---|---|---|---|
| | {0, 2} or {0, 3} | {0} | 0.5 ms | 1 ms |
| | {0, 2} or {0, 3} | {0, 2} or {0, 3} | 0.5 ms | 1 ms |
| | {0, 1, 2, 4} or {0, 1, 3, 4} | {0, 1, 2, 4} or {0, 1, 3, 4} | Four or three symbols | 0.5 ms or 1 ms |
| | {0, 1, 2, 3, 4, 5} | {0, 1, 2, 3, 4, 5} | Two symbols | Four or three symbols, 0.5 ms, or 1 ms |
| 5 | {0, 1, 2, 3, 4} | {0} | Two symbols | 1 ms |
| | {0, 1, 2, 3, 4} | {0, 2} | Two symbols | 0.5 ms or 1 ms |
| | {0, 1, 2, 3, 4} | {0, 1, 2, 3} or {0, 1, 2 4} | Two symbols | Four or three symbols, 0.5 ms, or 1 ms |
| | {0, 1, 2, 3} or {0, 1, 2, 4} | {0} | Four or three symbols | 1 ms |
| | {0, 1, 2, 3} or {0, 1, 2, 4} | {0, 2} | Four or three symbols | 0.5 ms or 1 ms |
| | {0, 2} | {0} | 0.5 ms | 1 ms |
| | {0, 2} | {0, 2} | 0.5 ms | 1 ms |
| | {0, 1, 2, 3} or {0, 1, 2, 4} | {0, 1, 2, 3} or {0, 1, 2, 4} | Four or three symbols | 0.5 ms or 1 ms |
| | {0, 1, 2, 3, 4} | {0, 1, 2, 3, 4} | Two symbols | Four or three symbols, 0.5 ms, or 1 ms |

For example, the first one or two symbols of a subframe are PDCCH symbols. For the normal CP, when $N_T$ is equal to 13, the first two symbols form a time unit 0, and each of the following 12 symbols forms a time unit, so that time units 1, 2, . . . , and 12 are obtained through sorting in sequence; or for the extended CP, when $N_T$ is equal to 11, the first two symbols form a time unit 0, and each of the following 10 symbols forms a time unit, so that time units 1, 2, . . . , and 10 are obtained through sorting in sequence. In some embodiments, when the first two symbols of a subframe are PDCCH symbols, the first data transmission is downlink data transmission. Moreover, when the first TTI length is the length of one symbol, because no downlink data transmission occurs in the time unit 0, the first DCI used to schedule the first data transmission in the time unit 1 may be located in the time unit 0, that is, there may be no first search space in the time unit 1. Therefore, for the normal CP, the first time unit set may be {0, 2, 3, 4, 5, 6, 7, 8, 9, 10, 11, 12}; for the extended CP, the first time unit set may be {0, 2, 3, 4, 5, 6, 7, 8, 9, 10}. A plurality of optional combinations are described in Table 5, and any combination described in Table 5 may be used as a separate embodiment. It should be noted that a combination of the first time unit set and the second time unit set is not limited to manners in Table 5, and may alternatively be in another manner.

TABLE 5

| $N_T$ | First time unit set | Second time unit set | First TTI length | Second TTI length |
|---|---|---|---|---|
| 11 | {0, 1, 2, 3, 4, 5, 6, 7, 8, 9, 10} or {0, 2, 3, 4, 5, 6, 7, 8, 9, 10} | {0} | One symbol | 1 ms |
| | {0, 1, 2, 3, 4, 5, 6, 7, 8, 9, 10} or {0, 2, 3, 4, 5, 6, 7, 8, 9, 10} | {0, 5} | One symbol | 0.5 ms or 1 ms |
| | {0, 1, 2, 3, 4, 5, 6, 7, 8, 9, 10} or {0, 2, 3, 4, 5, 6, 7, 8, 9, 10} | {0, 1, 5, 7}, {0, 2, 5, 7}, {0, 1, 5, 8}, or {0, 2, 5, 8} | One symbol | Four or three symbols, 0.5 ms, or 1 ms |
| | {0, 1, 2, 3, 4, 5, 6, 7, 8, 9, 10} or {0, 2, 3, 4, 5, 6, 7, 8, 9, 10} | {0, 1, 3, 5, 7, 9} or {0, 3, 5, 7, 9} | One symbol | Two symbols, four or three symbols, 0.5 ms, or 1 ms |
| | {0, 1, 3, 5, 7, 9} or {0, 3, 5, 7, 9} | {0} | Two symbols | 1 ms |
| | {0, 1, 3, 5, 7, 9} or {0, 3, 5, 7, 9} | {0, 5} | Two symbols | 0.5 ms or 1 ms |
| | {0, 1, 3, 5, 7, 9} or {0, 3, 5, 7, 9} | {0, 1, 5, 7}, {0, 2, 5, 7}, {0, 1, 5, 8}, or {0, 2, 5, 8} | Two symbols | Four or three symbols, 0.5 ms, or 1 ms |
| | {0, 1, 5, 7}, {0, 2, 5, 7}, {0, 1, 5, 8}, or {0, 2, 5, 8} | {0} | Four or three symbols | 1 ms |
| | {0, 1, 5, 7}, {0, 2, 5, 7}, {0, 1, 5, 8}, or {0, 2, 5, 8} | {0, 5} | Four or three symbols | 0.5 ms or 1 ms |
| | {0, 5} | {0} | 0.5 ms | 1 ms |
| | {0, 5} | {0, 5} | 0.5 ms | 1 ms |
| | {0, 1, 5, 7}, {0, 2, 5, 7}, {0, 1, 5, 8}, or {0, 2, 5, 8} | {0, 1, 5, 7}, {0, 2, 5, 7}, {0, 1, 5, 8}, or {0, 2, 5, 8} | Four or three symbols | 0.5 ms or 1 ms |
| | {0, 1, 3, 5, 7, 9} or {0, 3, 5, 7, 9} | {0, 1, 3, 5, 7, 9} or {0, 3, 5, 7, 9} | Two symbols | Four or three symbols, 0.5 ms, or 1 ms |

TABLE 5-continued

| $N_T$ | First time unit set | Second time unit set | First TTI length | Second TTI length |
|---|---|---|---|---|
| | {0, 1, 2, 3, 4, 5, 6, 7, 8, 9, 10} or {0, 2, 3, 4, 5, 6, 7, 8, 9, 10} | {0, 1, 2, 3, 4, 5, 6, 7, 8, 9, 10} or {0, 2, 3, 4, 5, 6, 7, 8, 9, 10} | One symbol | Two symbols, four or three symbols, 0.5 ms, or 1 ms |
| 13 | {0, 1, 2, 3, 4, 5, 6, 7, 8, 9, 10, 11, 12} or {0, 2, 3, 4, 5, 6, 7, 8, 9, 10, 11, 12} | {0} | One symbol | 1 ms |
| | {0, 1, 2, 3, 4, 5, 6, 7, 8, 9, 10, 11, 12} or {0, 2, 3, 4, 5, 6, 7, 8, 9, 10, 11, 12} | {0, 6} | One symbol | 0.5 ms or 1 ms |
| | {0, 1, 2, 3, 4, 5, 6, 7, 8, 9, 10, 11, 12} or {0, 2, 3, 4, 5, 6, 7, 8, 9, 10, 11, 12} | {0, 2, 6, 10}, {0, 3, 6, 10}, {0, 2, 6, 9}, or {0, 3, 6, 9} | One symbol | Four or three symbols, 0.5 ms, or 1 ms |
| | {0, 1, 2, 3, 4, 5, 6, 7, 8, 9, 10, 11, 12} or {0, 2, 3, 4, 5, 6, 7, 8, 9, 10, 11, 12} | {0, 1, 3, 5, 7, 9, 11} or {0, 3, 5, 7, 9, 11} | One symbol | Two symbols, four or three symbols, 0.5 ms, or 1 ms |
| | {0, 1, 3, 5, 7, 9, 11} or {0, 3, 5, 7, 9, 11} | {0} | Two symbols | 1 ms |
| | {0, 1, 3, 5, 7, 9, 11} or {0, 3, 5, 7, 9, 11} | {0, 6}, {0, 5}, or {0, 7} | Two symbols | 0.5 ms or 1 ms |
| | {0, 1, 3, 5, 7, 9, 11} or {0, 3, 5, 7, 9, 11} | {0, 3, 5, 9}, {0, 3, 7, 9}, {0, 3, 7, 11}, {0, 1, 5, 9}, {0, 1, 5, 7}, {0, 1, 7, 9}, {0, 2, 6, 10}, {0, 3, 6, 10}, {0, 2, 6, 9}, or {0, 3, 6, 9} | Two symbols | Four or three symbols, 0.5 ms, or 1 ms |
| | {0, 3, 5, 9}, {0, 3, 7, 9}, {0, 3, 7, 11}, {0, 1, 5, 9}, {0, 1, 5, 7}, {0, 1, 7, 9}, {0, 2, 6, 10}, {0, 3, 6, 10}, {0, 2, 6, 9}, or {0, 3, 6, 9} | {0} | Four or three symbols | 1 ms |
| | {0, 3, 5, 9}, {0, 3, 7, 9}, {0, 3, 7, 11}, {0, 1, 5, 9}, {0, 1, 5, 7}, {0, 1, 7, 9}, {0, 2, 6, 10}, {0, 3, 6, 10}, {0, 2, 6, 9}, or {0, 3, 6, 9} | {0, 6}, {0, 5}, or {0, 7} | Four or three symbols | 0.5 ms or 1 ms |
| | {0, 6}, {0, 5}, or {0, 7} | {0} | 0.5 ms | 1 ms |
| | {0, 6}, {0, 5}, or {0, 7} | {0, 6}, {0, 5}, or {0, 7} | 0.5 ms | 1 ms |
| | {0, 3, 5, 9}, {0, 3, 7, 9}, {0, 3, 7, 11}, {0, 1, 5, 9}, {0, 1, 5, 7}, {0, 1, 7, 9}, {0, 2, 6, 10}, {0, 3, 6, 10}, {0, 2, 6, 9}, or {0, 3, 6, 9} | {0, 3, 5, 9}, {0, 3, 7, 9}, {0, 3, 7, 11}, {0, 1, 5, 9}, {0, 1, 5, 7}, {0, 1, 7, 9}, {0, 2, 6, 10}, {0, 3, 6, 10}, {0, 2, 6, 9}, or {0, 3, 6, 9} | Four or three symbols | 0.5 ms or 1 ms |
| | {0, 1, 3, 5, 7, 9, 11} or {0, 3, 5, 7, 9, 11} | {0, 1, 3, 5, 7, 9, 11} or {0, 3, 5, 7, 9, 11} | Two symbols | Four or three symbols, 0.5 ms, or 1 ms |
| | {0, 1, 2, 3, 4, 5, 6, 7, 8, 9, 10, 11, 12} or {0, 2, 3, 4, 5, 6, 7, 8, 9, 10, 11, 12} | {0, 1, 2, 3, 4, 5, 6, 7, 8, 9, 10, 11, 12, 13} or {0, 2, 3, 4, 5, 6, 7, 8, 9, 10, 11, 12} | One symbol | Two symbols, four or three symbols, 0.5 ms, or 1 ms |

For example, the first two or three symbols of a subframe are PDCCH symbols. For the normal CP, when $N_T$ is equal to 12, the first three symbols form a time unit 0, and each of the following 11 symbols forms a time unit, so that time units 1, 2, . . . , and 11 are obtained through sorting in sequence; or for the extended CP, when $N_T$ is equal to 10, the first three symbols form a time unit 0, and each of the following nine symbols forms a time unit, so that time units 1, 2, . . . , and 9 are obtained through sorting in sequence. In some embodiments, when the first three symbols of a subframe are PDCCH symbols, the first data transmission is downlink data transmission. Moreover, when the first TTI length is the length of one symbol, because no downlink data transmission occurs in the time unit 0, the first DCI used to schedule the first data transmission in the time unit 1 may be located in the time unit 0, that is, there may be no first search space in the time unit 1. Therefore, for the normal CP, the first time unit set may be {0, 2, 3, 4, 5, 6, 7, 8, 9, 10, 11}; for the extended CP, the first time unit set may be {0, 2, 3, 4, 5, 6, 7, 8, 9}. A plurality of optional combinations are described in Table 6, and any combination described in Table 6 may be used as a separate embodiment. It should be noted that a combination of the first time unit set and the second time unit set is not limited to manners in Table 6, and may alternatively be in another manner.

TABLE 6

| $N_T$ | First time unit set | Second time unit set | First TTI length | Second TTI length |
|---|---|---|---|---|
| 10 | {0, 1, 2, 3, 4, 5, 6, 7, 8, 9} or {0, 2, 3, 4, 5, 6, 7, 8, 9} | {0} | One symbol | 1 ms |
| | {0, 1, 2, 3, 4, 5, 6, 7, 8, 9} or {0, 2, 3, 4, 5, 6, 7, 8, 9} | {0, 4} | One symbol | 0.5 ms or 1 ms |
| | {0, 1, 2, 3, 4, 5, 6, 7, 8, 9} or {0, 2, 3, 4, 5, 6, 7, 8, 9} | {0, 1, 4, 6} or {0, 1, 4, 7} | One symbol | Four or three symbols, 0.5 ms, or 1 ms |
| | {0, 1, 2, 3, 4, 5, 6, 7, 8, 9} or {0, 2, 3, 4, 5, 6, 7, 8, 9} | {0, 2, 4, 6, 8} | One symbol | Two symbols, four or three symbols, 0.5 ms, or 1 ms |
| | {0, 1, 4, 6} or {0, 1, 4, 7} | {0} | Four or three symbols | 1 ms |
| | {0, 1, 4, 6} or {0, 1, 4, 7} | {0, 4} | Four or three symbols | 0.5 ms or 1 ms |
| | {0, 4} | {0} | 0.5 ms | 1 ms |
| | {0, 4} | {0, 4} | 0.5 ms | 1 ms |
| | {0, 1, 4, 6} or {0, 1, 4, 7} | {0, 1, 4, 6} or {0, 1, 4, 7} | Four or three symbols | 0.5 ms or 1 ms |
| | {0, 1, 2, 3, 4, 5, 6, 7, 8, 9} or {0, 2, 3, 4, 5, 6, 7, 8, 9} | {0, 1, 2, 3, 4, 5, 6, 7, 8, 9} or {0, 2, 3, 4, 5, 6, 7, 8, 9} | One symbol | Two symbols, four or three symbols, 0.5 ms, or 1 ms |
| 12 | {0, 1, 2, 3, 4, 5, 6, 7, 8, 9, 10, 11} or {0, 2, 3, 4, 5, 6, 7, 8, 9, 10, 11} | {0} | One symbol | 1 ms |
| | {0, 1, 2, 3, 4, 5, 6, 7, 8, 9, 10, 11} or {0, 2, 3, 4, 5, 6, 7, 8, 9, 10, 11} | {0, 5} | One symbol | 0.5 ms or 1 ms |
| | {0, 1, 2, 3, 4, 5, 6, 7, 8, 9, 10, 11} or {0, 2, 3, 4, 5, 6, 7, 8, 9, 10, 11} | {0, 1, 5, 8}, {0, 1, 5, 9}, {0, 2, 5, 8}, or {0, 2, 5, 9} | One symbol | Four or three symbols, 0.5 ms, or 1 ms |
| | {0, 1, 2, 3, 4, 5, 6, 7, 8, 9, 10, 11} or {0, 2, 3, 4, 5, 6, 7, 8, 9, 10, 11} | {0, 2, 4, 6, 8, 10} | One symbol | Two symbols, four or three symbols, 0.5 ms, or 1 ms |
| | {0, 1, 5, 8}, {0, 1, 5, 9}, {0, 2, 5, 8}, or {0, 2, 5, 9} | {0} | Four or three symbols | 1 ms |
| | {0, 1, 5, 8}, {0, 1, 5, 9}, {0, 2, 5, 8}, or {0, 2, 5, 9} | {0, 5} | Four or three symbols | 0.5 ms or 1 ms |
| | {0, 5} | {0} | 0.5 ms | 1 ms |
| | {0, 5} | {0, 5} | 0.5 ms | 1 ms |
| | {0, 1, 5, 8}, {0, 1, 5, 9}, {0, 2, 5, 8}, or {0, 2, 5, 9} | {0, 1, 5, 8}, {0, 1, 5, 9}, {0, 2, 5, 8}, or {0, 2, 5, 9} | Four or three symbols | 0.5 ms or 1 ms |
| | {0, 1, 2, 3, 4, 5, 6, 7, 8, 9, 10, 11} or {0, 2, 3, 4, 5, 6, 7, 8, 9, 10, 11} | {0, 1, 2, 3, 4, 5, 6, 7, 8, 9, 10, 11} or {0, 2, 3, 4, 5, 6, 7, 8, 9, 10, 11} | One symbol | Two symbols, four or three symbols, 0.5 ms, or 1 ms |

For example, the first three symbols of a subframe are PDCCH symbols. For the normal CP, when $N_T$ is equal to 11, the first four symbols form a time unit 0, and each of the following 10 symbols forms a time unit, so that time units 1, 2, . . . , and 10 are obtained through sorting in sequence; or for the extended CP, when $N_T$ is equal to 9, the first four symbols form a time unit 0, and each of the following eight symbols forms a time unit, so that time units 1, 2, . . . , and 8 are obtained through sorting in sequence. A plurality of optional combinations are described in Table 7, and any combination described in Table 7 may be used as a separate embodiment. It should be noted that a combination of the first time unit set and the second time unit set is not limited to manners in Table 7, and may alternatively be in another manner.

TABLE 7

| $N_T$ | First time unit set | Second time unit set | First TTI length | Second TTI length |
|---|---|---|---|---|
| 9 | {0, 1, 2, 3, 4, 5, 6, 7, 8} | {0} | One symbol | 1 ms |
| | {0, 1, 2, 3, 4, 5, 6, 7, 8} | {0, 3} | One symbol | 0.5 ms or 1 ms |
| | {0, 1, 2, 3, 4, 5, 6, 7, 8} | {0, 1, 3, 5} or {0, 1, 3, 6} | One symbol | Four or three symbols, 0.5 ms, or 1 ms |
| | {0, 1, 2, 3, 4, 5, 6, 7, 8} | {0, 1, 3, 5, 7} | One symbol | Two symbols, four or three symbols, 0.5 ms, or 1 ms |
| | {0, 1, 3, 5} or {0, 1, 3, 6} | {0} | Four or three symbols | 1 ms |

TABLE 7-continued

| $N_T$ | First time unit set | Second time unit set | First TTI length | Second TTI length |
|---|---|---|---|---|
| | {0, 1, 3, 5} or {0, 1, 3, 6} | {0, 3} | Four or three symbols | 0.5 ms or 1 ms |
| | {0, 3} | {0} | 0.5 ms | 1 ms |
| | {0, 3} | {0, 3} | 0.5 ms | 1 ms |
| | {0, 1, 3, 5} or {0, 1, 3, 6} | {0, 1, 3, 5} or {0, 1, 3, 6} | Four or three symbols | 0.5 ms or 1 ms |
| | {0, 1, 2, 3, 4, 5, 6, 7, 8} | {0, 1, 2, 3, 4, 5, 6, 7, 8} | One symbol | Two symbols, four or three symbols, 0.5 ms, or 1 ms |
| 11 | {0, 1, 2, 3, 4, 5, 6, 7, 8, 9, 10} | {0} | One symbol | 1 ms |
| | {0, 1, 2, 3, 4, 5, 6, 7, 8, 9, 10} | {0, 4} | One symbol | 0.5 ms or 1 ms |
| | {0, 1, 2, 3, 4, 5, 6, 7, 8, 9, 10} | {0, 1, 4, 7} or {0, 1, 4, 8} | One symbol | Four or three symbols, 0.5 ms, or 1 ms |
| | {0, 1, 2, 3, 4, 5, 6, 7, 8, 9, 10} | {0, 1, 3, 5, 7, 9} | One symbol | Two symbols, four or three symbols, 0.5 ms, or 1 ms |
| | {0, 1, 4, 7} or {0, 1, 4, 8} | {0} | Four or three symbols | 1 ms |
| | {0, 1, 4, 7} or {0, 1, 4, 8} | {0, 4} | Four or three symbols | 0.5 ms or 1 ms |
| | {0, 4} | {0} | 0.5 ms | 1 ms |
| | {0, 4} | {0, 4} | 0.5 ms | 1 ms |
| | {0, 1, 4, 7} or {0, 1, 4, 8} | {0, 1, 4, 7} or {0, 1, 4, 8} | Four or three symbols | 0.5 ms or 1 ms |
| | {0, 1, 2, 3, 4, 5, 6, 7, 8, 9, 10} | {0, 1, 2, 3, 4, 5, 6, 7, 8, 9, 10} | One symbol | Two symbols, four or three symbols, 0.5 ms, or 1 ms |

In this embodiment of the present invention, in some embodiments, the first time unit is the same as the second time unit, and the first search space and the second search space partially or completely overlap. For example, the first search space and the second search space occupy resource elements that are partially or exactly the same.

When the first time unit is the same as the second time unit, and the first search space and the second search space partially or completely overlap, the terminal device needs to determine whether detected DCI is the first DCI or the second DCI. It should be noted that, how to distinguish between the first DCI and the second DCI is not limited in the present invention. For example, the present invention provides four methods for distinguishing between the first DCI and the second DCI:

Method 1: A quantity of information bits of the first DCI is the same as a quantity of information bits of the second DCI, and the first DCI and the second DCI each include an information field for indicating a DCI type. The information field indicates that the DCI is the first DCI or the second DCI.

Method 2: A radio network temporary identifier (RNTI) for scrambling the first DCI is different from that for scrambling the second DCI. Therefore, the terminal device can distinguish between different DCI by using the different RNTIs.

Method 3: The first DCI and the second DCI use different masks (mask) to scramble a cyclic redundancy code (CRC). Therefore, the terminal device can distinguish between different DCI by using the different masks.

Method 4: The first DCI and the second DCI are located in different information fields in same DCI. Therefore, the terminal device obtains the first DCI and/or the second DCI from the different information fields in the same DCI.

In some embodiments, the first time unit is the same as the second time unit, and the first search space and the second search space partially overlap. In some embodiments, the first search space is a part of the second search space; or the second search space is a part of the first search space; or a part of the first search space and a part of the second search space overlap. For example, in a time unit 0, the first search space is a part of the second search space.

In some embodiments, the first time unit is the same as the second time unit, and the first search space and the second search space completely overlap. In other words, the first search space and the second search space are a same search space. In this way, it means that, the terminal device determines only one search space. As shown in FIG. 3, for example, one subframe includes four time units, the first time unit set is {0, 1, 2, 3}, the second time unit set is {0, 2}, and the first search space and the second search space in the time unit 0 or 2 occupy a same resource. In some embodiments, a quantity of information bits of the first DCI is the same as a quantity of information bits of the second DCI, that is, a payload size of the first DCI is the same as that of the second DCI. In this case, when the first DCI and the second DCI are simultaneously detected, a quantity of times that the terminal device performs blind detection can be reduced.

In some embodiments, sizes of the first search spaces determined by the terminal device in two different time units in the first time unit set is different. In some embodiments, a size of a search space may be measured by using a quantity of resource elements occupied by the search space. For example, the first time unit set includes a time unit i and a time unit j, where i is not equal to j. Determining of the first search space by the terminal device includes: When the first time unit is the time unit i, the first search space occupies M resource elements, and when the first time unit is the time unit j, the first search space occupies N resource elements, where M and N are positive integers, and M is not equal to N. In some embodiments, a size of a search space may be measured by using a quantity of candidate control channels of the search space. Specifically, determining of the first search space by the terminal device includes: When the first time unit is the time unit i, the first search space includes P candidate control channels, and when the first time unit is the time unit j, the first search space includes Q candidate control channels, where P and Q are positive integers, and P is not equal to Q. For example, i is 0, j is greater than 0, and M is greater than N (or P is greater than Q). For example, one subframe includes two time units. When the first time unit is a time unit 0, the first search space includes four, three, or two candidate control channels that have an aggregation level of 1 or 2 and that belong to a UESS, and/or one or two candidate control channels that have an aggregation level of 4 or 8 and that belong to the UESS, and/or four candidate control channels that have an aggregation level of 4 and that belong to a CSS, and/or two candidate control channels that have an aggregation level of 8 and that belong to the CSS; or when the first time unit is a time unit 1, the first search space includes four, three, or two candidate control channels that have an aggregation level of 1 or 2 and that belong to a UESS, and/or one or two candidate control channels that have an aggregation level of 4 or 8 and that belong to the UESS.

In some embodiments, when the second time unit set includes at least two time units, sizes of the second search spaces determined by the terminal device in two different time units in the second time unit set are different. Refer to the foregoing descriptions for a specific embodiment, provided that "the first time unit" is replaced by "the second time unit" and "the first search space" is replaced by "the second search space". Details are not described herein again.

In this embodiment of the present invention, In some embodiments, a TTI length for the second data transmission is 1 ms, a TTI length for the first data transmission is a short TTI length, the first search space does not include a candidate control channel belonging to the common search space CSS, and the second search space includes a candidate control channel belonging to the CSS and a candidate control channel belonging to the UESS. For example, in the time unit 0, the second search space includes a PDCCH CSS and a PDCCH UESS, and the first search space includes only a PDCCH UESS. The first search space is relatively small, so that a speed for detecting the first DCI can be increased, especially when quantities of bits of the first DCI and the second DCI are different.

In some embodiments, before the terminal device determines the at least one search space of the first search space and the second search space, the method further includes: receiving, by the terminal device, signaling sent by the network device, where the signaling includes information used to indicate the first search space and/or the second search space, and the signaling is higher layer signaling or physical layer signaling. For example, if the first search space and/or the second search space are/is located in a PDSCH area or a control channel is a PDSCH, the signaling indicates a time-frequency domain resource occupied by the first search space and/or the second search space or a candidate control channel included in the first search space and/or the second search space.

With reference to the foregoing embodiments, the following further describes the technical solutions in the embodiments of the present invention by using two specific application examples. Application example 1: One subframe includes seven time units, a TTI length for the first data transmission is the length of two symbols, a TTI length for the second data transmission is 0.5 ms, the first time unit set is {0, 1, 2, 3, 4, 5, 6}, and the second time unit set is {0, 3} or {0, 4}. If the second time unit set is {0, 3}, when the first time unit and the second time unit are both the time unit 0, the first search space and the second search space are the same, and include a PDCCH CSS and a PDCCH UESS; when the first time unit and the second time unit are both the time unit 3, the first search space and the second search space are the same, and are located in a PDSCH area; and in the time unit 1, 2, 4, 5, or 6, the first search space is located in the PDSCH area, and the second search space does not exist. If the second time unit set is {0, 4}, when the first time unit and the second time unit are both the time unit 0, the first search space and the second search space are the same, and includes a PDCCH CSS and a PDCCH UESS; when the first time unit and the second time unit are both the time unit 4, the first search space and the second search space are the same, and are located in a PDSCH area; and in the time unit 1, 2, 3, 5, or 6, the first search space is located in the PDSCH area, and the second search space does not exist. Application example 2: One subframe includes two time units, a TTI length for the first data transmission is 0.5 ms, a TTI length for the second data transmission is 1 ms, the first time unit set includes time units 0 and 1, and the second time unit set includes the time unit 0. When the first time unit and the second time unit are both the time unit 0, the second search space includes a PDCCH CSS and a PDCCH UESS, and the first search space includes only the PDCCH UESS; and in the time unit 1, the first search space is located in a PDSCH area, and the second search space does not exist.

The terminal device detects at least one piece of DCI in the determined at least one search space. If the terminal device detects a candidate control channel that passes cyclic redundancy check (CRC), DCI carried on the candidate control channel is DCI that is for scheduling data transmission and that is sent by the network device to the terminal device; otherwise, if the terminal device does not detect a candidate control channel that passes CRC, it indicates that the network device does not send DCI to the terminal device. It should be noted that how to detect DCI by the terminal device is not limited in the present invention. For example, that the terminal device detects the first DCI in the first search space may be: the terminal device decodes all or some of candidate downlink control channels in the first search space based on a quantity of information bits of the first DCI.

In some embodiments, if detecting DCI used to schedule data transmission, the terminal device may perform the data transmission with the network device based on the DCI. For downlink data transmission, the terminal device may receive, on a data transmission resource indicated by the DCI, a downlink data packet sent by the network device; for uplink data transmission, the terminal device may send an uplink data packet to the network device on the data transmission resource indicated by the DCI. In some embodiments, the data transmission resource indicated by the DCI is a time domain resource for data transmission.

In some embodiments, that the terminal device detects at least one piece of DCI in the at least one search space includes: detecting, by the terminal device, the first DCI in the determined first search space, and/or, detecting the second DCI in the determined second search space. If the terminal device detects the first DCI and/or the second DCI, the terminal device performs the first data transmission and/or the second data transmission with the network device based on the detected first DCI and/or second DCI. When the first data transmission or the second data transmission is downlink data transmission, the terminal device receives downlink data sent by the network device; when the first data transmission or the second data transmission is uplink data transmission, the terminal device sends uplink data to the network device. It should be noted that there is no strict time sequence relationship between detection on the first DCI by the terminal device and detection on the second DCI. For example, the terminal device may first detect the first DCI, and then detect the second DCI; first detect the second DCI, and then detect the first DCI; or detect the first DCI and the second DCI at the same time.

Figure 4A:
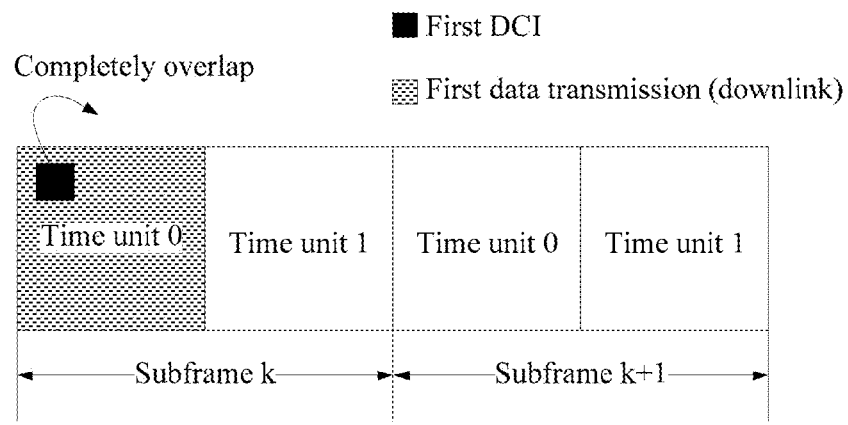
FIG. 4a, FIG. 4b, FIG. 4c, FIG. 4d, FIG. 4e, FIG. 4f, FIG. 4g, and FIG. 4h are schematic diagrams in which DCI indicates data transmission according to an embodiment of the present invention.
Figure 4B:
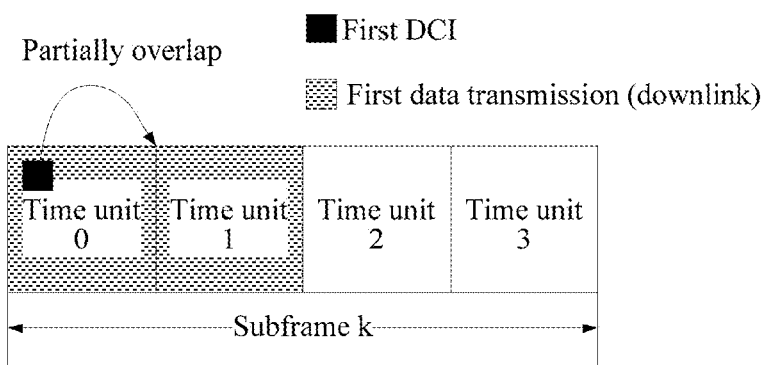
Figure 4C:
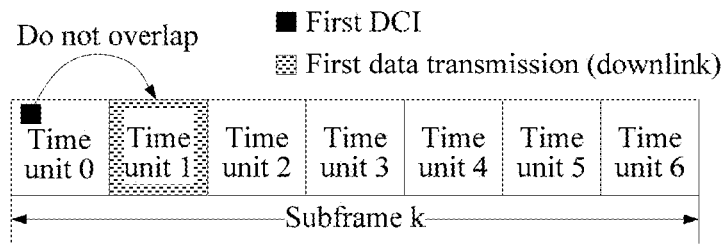

In this embodiment of the present invention, in some embodiments, after the terminal device detects the at least one piece of downlink control information DCI in the at least one search space, the method further includes: performing, by the terminal device based on the detected first DCI, the first data transmission with the network device in at least one time unit, where the first data transmission is downlink data transmission, and the at least one time unit and the first time unit completely or partially overlap or do not overlap. As shown in FIG. 4a, for example, one subframe includes two time units, a TTI length for the first data transmission is 0.5 ms, the first DCI is located in the first time unit, the first time unit is a time unit 0 of a subframe k, and the first data transmission is performed in the time unit 0 of the subframe k. To be specific, the first time unit and at least one time unit that is occupied for the first data transmission completely overlap or are the same. Alternatively, as shown in FIG. 4b, for example, one subframe includes four time units, a TTI length for the first data transmission is 0.5 ms, the first time unit is a time unit 0 of a subframe k, and the first data transmission is performed in the time unit 0 and a time unit 1 of the subframe k. To be specific, the first time unit and at least one time unit that is occupied for the first data transmission partially overlap. In some embodiments, the first one, two, three, or four symbols of a subframe may be used to transmit a PDCCH (referred to as a PDCCH area), but are not used for downlink data transmission. When the first time unit is located in the PDCCH area, the first data transmission cannot occupy the PDCCH area. To be specific, the first time unit and a time unit that is occupied for the first data transmission do not overlap. As shown in FIG. 4c, for example, one subframe includes six or seven time units, a TTI length for the first data transmission is the length of two symbols, the first time unit is a time unit 0 of a subframe k, and the first data transmission is performed in a time unit 1 of the subframe k. To be specific, the first time unit and at least one time unit that is occupied for the first data transmission do not overlap.

Figure 4D:
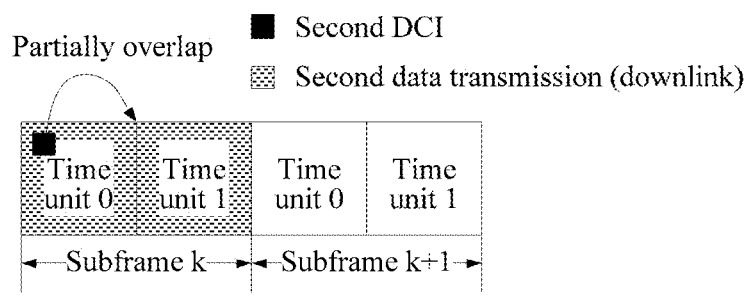
Figure 4E:
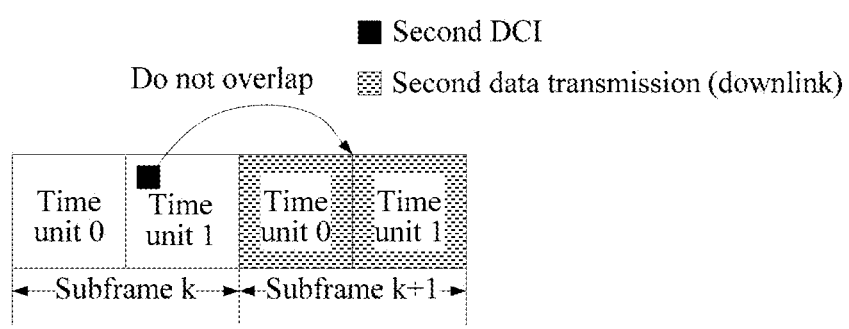

In this embodiment of the present invention, in some embodiments, after the terminal device detects the at least one piece of downlink control information DCI in the at least one search space, the method further includes: performing, by the user equipment based on the detected second DCI, the second data transmission with the network device in at least one time unit, where the second data transmission is downlink data transmission, and the second time unit and the at least one time unit partially overlap or do not overlap. As shown in FIG. 4d, for example, one subframe includes two time units, a TTI length for the second data transmission is 1 ms, the second DCI is located in the second time unit, the second time unit is a time unit 0 of a subframe k, and the second data transmission is performed in the time unit 0 and a time unit 1 of the subframe k. To be specific, the second time unit and at least one time unit occupied for the second data transmission partially overlap. Alternatively, as shown in FIG. 4e, for example, one subframe includes two time units, a TTI length for the second data transmission is 1 ms, the second DCI is located in the second time unit, the second time unit is a time unit 1 of a subframe k, and the second data transmission is performed in a time unit 0 and a time unit 1 of a subframe k+1. To be specific, the second time unit and at least one time unit occupied for the second data transmission do not overlap.

Figure 4F:
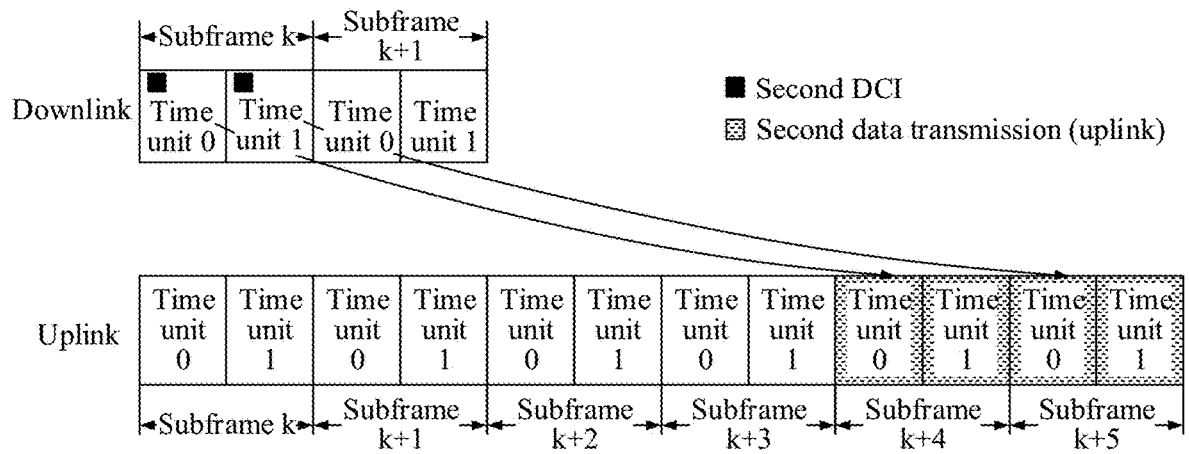

In this embodiment of the present invention, in some embodiments, after the terminal device detects the at least one piece of downlink control information DCI in the at least one search space, the method further includes: performing, by the user equipment based on the detected first or second DCI, the first or second data transmission with the network device, where the first or second data transmission is uplink data transmission, a starting time unit occupied for the first or second data transmission is delayed by a time length of $K \cdot L_T$ relative to the first or second time unit, K is a positive integer, for example, K is 4, and $L_T$ is a TTI length for the first or second data transmission. As shown in FIG. 4f, for example, one subframe includes two time units, the TTI length for the second data transmission is 1 ms, the second DCI is located in the second time unit, the second time unit is a time unit 0 of a subframe k, and the second data transmission is performed in a time unit 0 and a time unit 1 of a subframe k+4. To be specific, the starting time unit occupied for the second data transmission is delayed by eight time units relative to the second time unit. Alternatively, the second time unit is a time unit 1 of the subframe k, and the second data transmission is performed in a time unit 0 and a time unit 1 of a subframe k+5. To be specific, the starting time unit occupied for the second data transmission is delayed by nine time units relative to the second time unit.

Figure 4G:
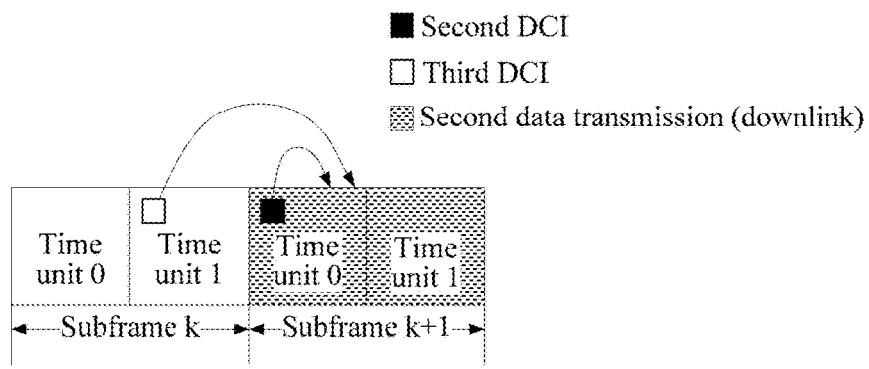
Figure 4H:
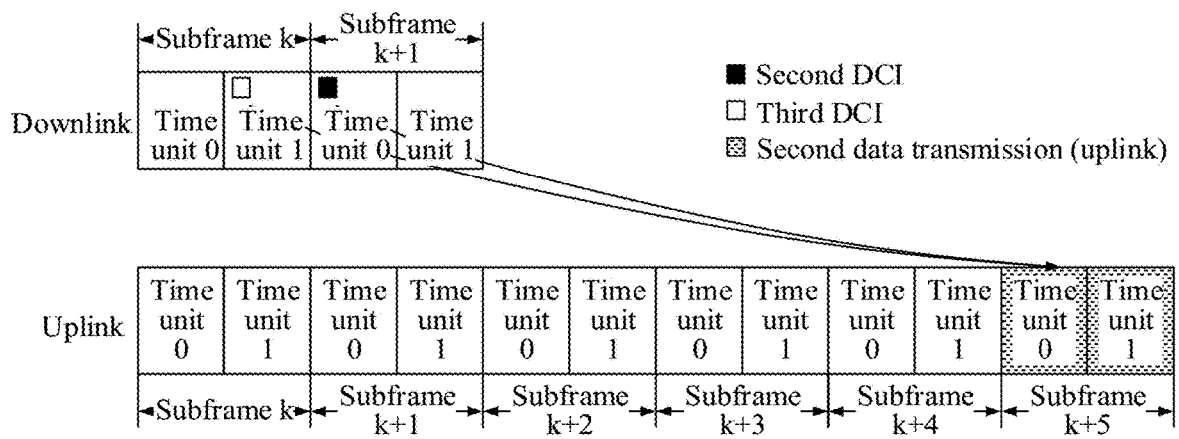

In this embodiment of the present invention, in some embodiments, the terminal device determines a third search space. The third search space is in a third time unit within the time window T. The terminal device detects third DCI in the third search space. The second DCI detected in the second search space by the terminal device and the third DCI detected in the third search space by the terminal device are both used to schedule the second data transmission. In some embodiments, the third time unit belongs to the second time unit set. As shown in FIG. 4g, for example, the second time unit set includes time units 0 and 1, the second data transmission is downlink data transmission having the second TTI length of 1 ms, the second DCI is located in a time unit 0 of a subframe k+1, the third DCI is located in a time unit 1 of a subframe k, the second DCI and the third DCI both may be used to schedule the second data transmission, and the second data transmission is performed in the time unit 0 and a time unit 1 of the subframe k+1. Alternatively, as shown in FIG. 4h, for example, the second time unit set includes time units 0 and 1, the second data transmission is uplink data transmission having the second TTI length of 1 ms, the second DCI is located in a time unit 0 of a subframe k+1, the third DCI is located in a time unit 1 of a subframe k, the second DCI and the third DCI both may be used to schedule the second data transmission, and the second data transmission is performed in a time unit 0 and a time unit 1 of the subframe k+5. According to the method, because the two pieces of DCI are both used to schedule same data transmission, a probability that the second data transmission is successfully scheduled can be increased.

According to this embodiment of the present invention, the first search space is in the first time unit, and the second search space is in the second time unit. The first time unit and the second time unit respectively belong to the first time unit set and the second time unit set, but the first time unit set and the second time unit set partially or completely overlap, so that the terminal device can detect, in different search spaces, DCI used to schedule different data transmission, to support data transmission having a plurality of TTI lengths or data transmission having a plurality of scheduling priorities. Further, if the second time unit set is the proper subset of the first time unit set, the network device may send the second DCI at lower frequency than the first DCI, and frequency that the terminal device determines the second search space and detects the second DCI can be reduced, thereby reducing processing complexity.

Figure 5:
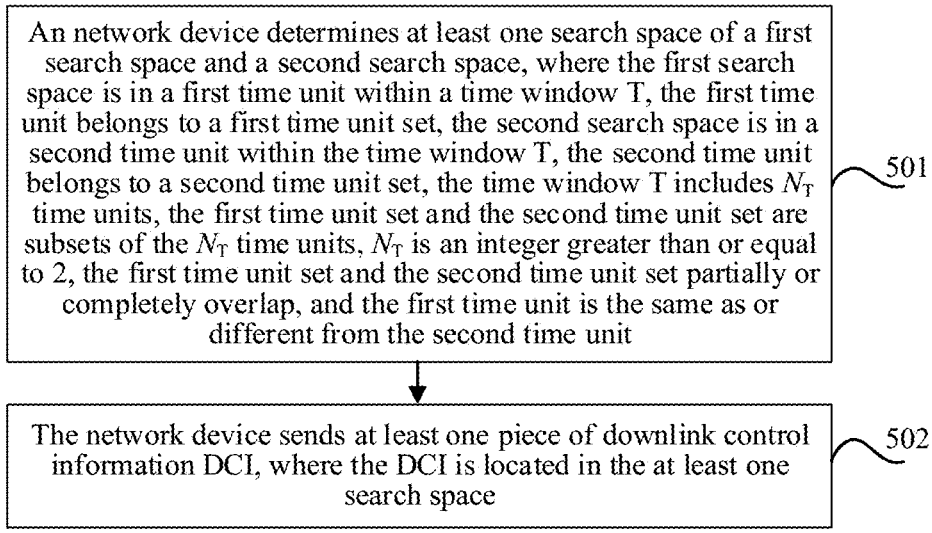
FIG. 5 is a schematic flowchart of a downlink control information sending method according to an embodiment of the present invention.

FIG. 5 is a schematic flowchart of a downlink control information sending method according to an embodiment of the present invention. It should be noted that, the method may be used as a separate embodiment, or may be used together with the foregoing downlink control information detection method. Unless otherwise specified, for content of this embodiment similar to that of the foregoing embodiment, refer to the descriptions in the foregoing embodiment, and details are not described subsequently again. This embodiment includes the following steps:

Step 501: A network device determines at least one of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit.

Step 502: The network device sends at least one piece of downlink control information DCI, where the at least one piece of DCI is located in the at least one search space.

In some embodiments, for a manner in which the network device determines the at least one search space of the first search space and the second search space, refer to the descriptions of the foregoing terminal device, and details are not described herein again.

In some embodiments, the first TTI length for the first data transmission is less than the second TTI length for the second data transmission. For the specific first TTI length and second TTI length, refer to the descriptions of the foregoing embodiment, and details are not described herein again.

In this embodiment, the time window T, the time unit, the first time unit set, and the second time unit set are described in the foregoing embodiment, and details are not specifically described herein again. For example, the first time unit set and the second time unit set may be any combination in Table 1 to Table 7.

In some embodiments, the second time unit set is a proper subset of the first time unit set. The network device may send the second DCI at lower frequency than the first DCI, and frequency that the terminal device determines the second search space and detects the second DCI can be reduced, thereby reducing processing complexity of the terminal device.

In some embodiments, the second time unit set and the first time unit set completely overlap. The network device may send the second DCI at lower frequency than the first DCI, but when the first time unit set and the second time unit set completely overlap, a chance of sending the second DCI by the network device can be increased, so that the network device can more flexibly configure and send the second DCI, thereby increasing a probability of successful scheduling by using the second DCI.

In some embodiments, before the network device determines the at least one search space of the first search space and the second search space, the method further includes: sending, by the network device, signaling to the terminal device, where the signaling is used to indicate the first time unit set and/or the second time unit set, and the signaling may be higher layer signaling or physical layer signaling.

In some embodiments, before the network device sends the at least one piece of DCI, the method further includes: sending, by the network device, signaling to the terminal device, where the signaling is used to indicate the first time unit and/or the second time unit. Therefore, after receiving the signaling, the terminal device determines the first time unit and/or the second time unit based on the signaling, and determines at least one of the first search space and the second search space in the first time unit and/or the second time unit, where the signaling may be higher layer signaling or physical layer signaling.

In this embodiment, the first search space and the second search space are described in the foregoing embodiment, and details are not described herein again.

It should be noted that how to configure DCI in a determined search space by the network device is not limited in the present invention. For example, the network device first determines that a time-frequency domain resource occupied by the first search space includes P resource elements. Further, the network device determines that some of the P resource elements are used to carry the first DCI. For example, the network device determines that the second search space includes Q candidate control channels, and selects one candidate control channel from the Q candidate control channels to carry the second DCI.

In some embodiments, before the network device sends the at least one piece of DCI, the method further includes: sending, by the network device, signaling to the terminal device. The signaling includes information used to indicate the first search space and/or the second search space, and the signaling is higher layer signaling or physical layer signaling. For specific content, refer to the foregoing embodiment, and details are not described herein again.

After or while sending the first DCI and/or the second DCI, the network device performs the first data transmission and/or the second data transmission with the terminal device. When the first data transmission or the second data transmission is downlink data transmission, the network device sends downlink data to the terminal device; when the first data transmission or the second data transmission is uplink data transmission, the network device receives uplink data sent by the terminal device.

In some embodiments, the first data transmission is downlink data transmission and is performed in at least one time unit, and the at least one time unit and the first time unit completely or partially overlap or do not overlap. For specific content, refer to the foregoing embodiment, and details are not described herein again.

In some embodiments, the second data transmission is downlink data transmission and is performed in at least one time unit, and the at least one time unit and the second time unit partially overlap or do not overlap. For specific content, refer to the foregoing embodiment, and details are not described herein again.

In some embodiments, the first or second data transmission is uplink data transmission, a starting time unit occupied for the first or second data transmission is delayed by at least a time length of K·L$_T$ relative to the first or second time unit, where K is a positive integer, for example, K is 4, and L$_T$ is a TTI length for the first or second data transmission. For specific content, refer to the foregoing embodiment, and details are not described herein again.

In this embodiment of the present invention, in some embodiments, the network device determines a third search space, where the third search space is in a third time unit within the time window T, and the third time unit belongs to the second time unit set; and the network device sends third DCI, where the third DCI is located in the third search space, and the second DCI sent in the second search space by the network device and the third DCI sent in the third search space by the network device are both used to schedule the second data transmission.

In a communications system, the network device may schedule data transmission having a plurality of TTI lengths. For example, a TTI length for downlink data transmission of a first terminal device is a length of two symbols, and a TTI length for downlink data transmission of a second terminal device is 0.5 ms. If different configuration manners are used for control areas corresponding to data transmission having different TTI lengths, for example, for a normal CP, a control channel area corresponding to the first terminal device is located in a symbol 7 or in symbols 7 and 8, and a control channel area corresponding to the second terminal device is located in the first one or more symbols in a second timeslot, there are a plurality of configuration manners for control channel areas in the communications system. This is unfavorable to multiplexing of resources between control channel areas corresponding to the different TTI lengths, and increases processing complexity of the network device. Therefore, in this embodiment of the present invention, the first search space may be a search space detected by the first terminal device, and the second search space may be a search space detected by the second terminal device. In this case, when there is data transmission having a plurality of TTI lengths in the communications system, a unified method can be used to configure search spaces and/or control channel areas, to effectively multiplex the search spaces and/or the control channel areas corresponding to different TTI lengths, and reduce scheduling complexity of the network device.

In this embodiment of the present invention, in some embodiments, the first search space determined by the network device is a search space detected by the first terminal device, and the second search space determined by the network device is a search space detected by the second terminal device. Correspondingly, the first DCI is for scheduling the first data transmission of the first terminal device, and the second DCI is for scheduling the second data transmission of the second terminal device. After or while sending the first DCI and/or the second DCI, the network device performs the first data transmission with the first terminal device and/or performs the second data transmission with the second terminal device. For example, N$_T$=7, the first TTI length is the length of two symbols, and the first time unit set includes time units {0, 1, 2, 3, 4, 5, 6}; and the second TTI length is 0.5 ms, and the second time unit set includes the time units {0, 3} or {0, 4}.

In some embodiments, the first data transmission and the second data transmission are both downlink data transmission, and the first TTI length for the first data transmission is less than the second TTI length for the second data transmission. Because the second TTI length is greater than the first TTI length, and the terminal device cannot determine in advance whether downlink data transmission having the second TTI length that exists in downlink data transmission having the first TTI length is scheduled, the first search space cannot be located in a frequency domain resource occupied for the downlink data transmission having the second TTI length; otherwise the terminal device wrongly receives downlink data having the second TTI length. Therefore, the first search space is located in a first frequency domain resource, where the first frequency domain resource cannot be used for the downlink data transmission having the second TTI length. In some embodiments, the first time unit is the same as the second time unit.

Figure 6A:
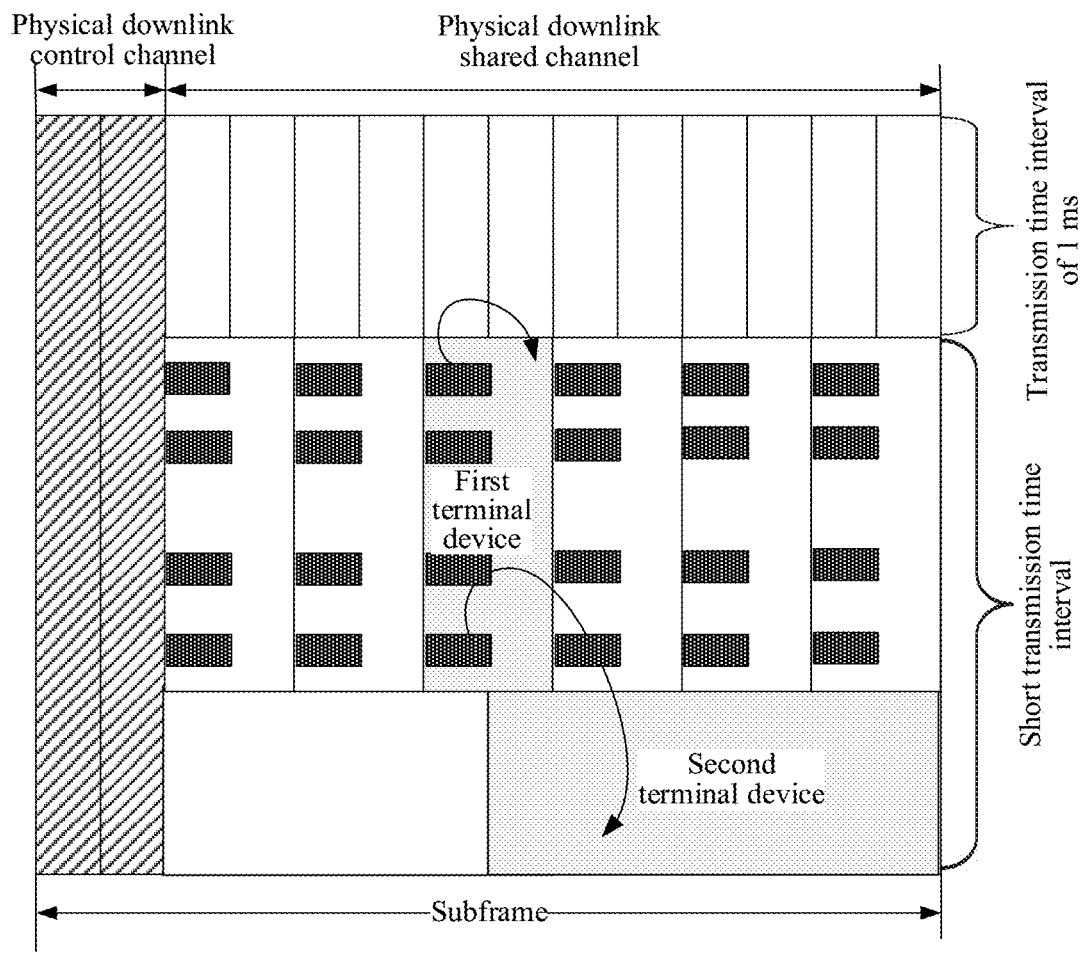
FIG. 6a and FIG. 6b are schematic diagrams in which a search space occupies a time-frequency resource according to an embodiment of the present invention.

In some embodiments, the first search space and the second search space are both located in a first frequency domain resource, where the first frequency domain resource cannot be used for downlink data transmission having the second TTI length. As shown in FIG. 6a, the first search space detected by the first terminal device and the second search space detected by the second terminal device are both located in a frequency band corresponding to downlink data transmission having a TTI length of two symbols. Further in some embodiments, the first search space and the second search space completely overlap, that is, the first terminal device and the second terminal device detect the same search space.

Figure 6B:
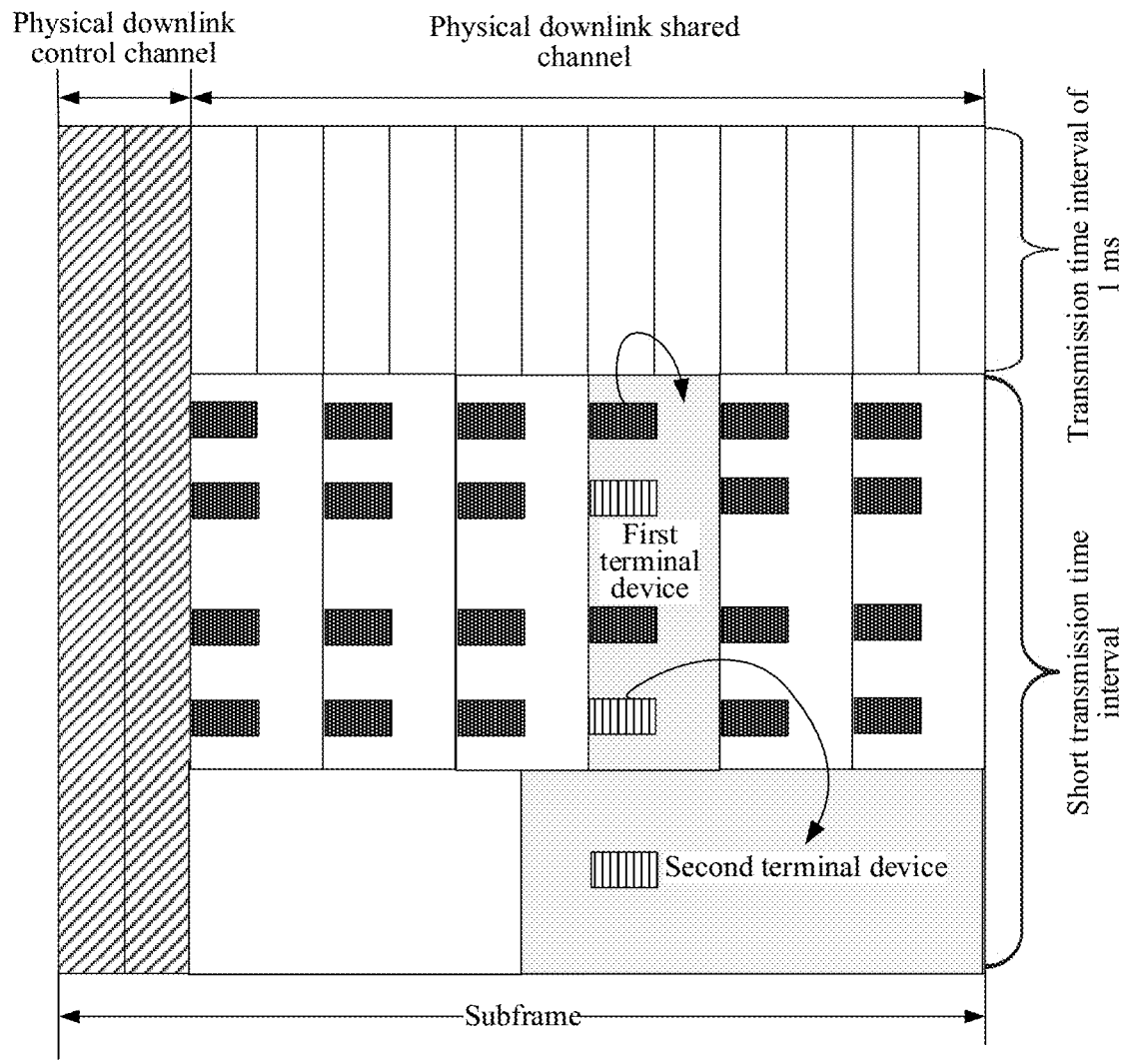

In some embodiments, the first search space is located in a first frequency domain resource, and the second search space is located in a second frequency domain resource, where the first frequency domain resource cannot be used for downlink data transmission having the second TTI length, and the second frequency domain resource can be used for the downlink data transmission having the second TTI length and/or downlink data transmission having the first TTI length. As shown in FIG. 6b, the first search space detected by the first terminal device is located in a frequency band occupied for downlink data transmission having a TTI length of two symbols, and the second search space detected by the second terminal device is located in a frequency band occupied for the downlink data transmission having the TTI length of two symbols and a frequency band occupied for downlink data transmission having a TTI length of 0.5 ms.

In some embodiments, before performing the first data transmission with the first terminal device, the network device sends indication information to the first terminal device. The indication information indicates a resource that cannot be occupied for the first data transmission, for example, a time domain resource and/or a frequency domain resource. The resource that cannot be occupied for the first data transmission includes a resource occupied by the first DCI and/or a resource occupied by the second DCI. The first data transmission is downlink data transmission, and a time unit in which the first search space is located, a time unit in which the second space is located, and a time unit in which the first data transmission is performed are the same (namely, the first time unit). In some embodiments, the indication information is included in the first DCI.

In some embodiments, before the network device determines the at least one search space of the first search space and the second search space, the method further includes: sending, by the network device, first time unit configuration information to the first terminal device, and/or, sending, by the network device, second time unit configuration information to the second terminal device, where the first time unit configuration information is used to indicate the first time unit set, and the second time unit configuration information is used to indicate the second time unit set.

According to this embodiment of the present invention, the first search space is in the first time unit, and the second search space is in the second time unit. The first time unit and the second time unit respectively belong to the first time unit set and the second time unit set, but the first time unit set and the second time unit set partially or completely overlap, so that the network device can more flexibly determine a search space, and configure, to different search spaces, DCI used to schedule different data transmission, to support data transmission having a plurality of TTI lengths or data transmission having a plurality of scheduling priorities. Further, if the second time unit set is the proper subset of the first time unit set, the network device may send the second DCI at lower frequency than the first DCI, and frequency that the terminal device determines the second search space and detects the second DCI can be reduced, thereby reducing processing complexity. If the first time unit set and the second time unit set completely overlap, a chance of sending the second DCI can be increased, so that the network device can more flexibly configure and send the second DCI, thereby increasing a probability of successful scheduling by using the second DCI.

Figure 7:
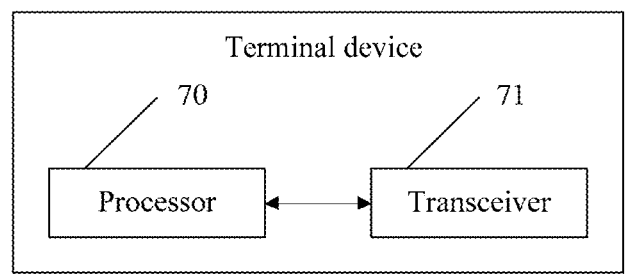
FIG. 7 is a schematic diagram of a first example according to an embodiment of the present invention.

FIG. 7 is a schematic structural diagram of a terminal device according to an embodiment of the present invention. It should be noted that the device may be configured to perform the method in the foregoing embodiment. Therefore, for content that is the same as content of the foregoing embodiment, refer to the descriptions in the foregoing embodiment, and details are not described subsequently again.

The device in this embodiment may include a processor and a transceiver, where the processor is in communication connection with the transceiver. Certainly, the device may further include a memory and the like. For example, the memory may store a pre-determined sequence, and may further store a pre-determined rule, and the like.

The processor is configured to determine at least one of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit.

The processor is configured to detect at least one piece of downlink control information DCI in the at least one search space.

The processor detects the at least one piece of DCI in the at least one search space. If a candidate control channel that passes CRC is detected, DCI carried on the candidate control channel is DCI that is for scheduling data transmission and that is sent by a network device to the terminal device. Otherwise, if the terminal device does not detect a candidate control channel that passes CRC, it indicates that the network device does not send DCI to the terminal device.

In some embodiments, if detecting DCI used to schedule data transmission, the processor may perform data transmission with the network device based on the DCI. For downlink data transmission, the transceiver of the terminal device may receive, on a data transmission resource indicated by the DCI, a downlink data packet sent by the network device; for uplink data transmission, the transceiver of the terminal device may send an uplink data packet to the network device on the data transmission resource indicated by the DCI.

In some embodiments, if the first time unit set and the second time unit set are predefined, the memory is further configured to store the first time unit set and the second time unit set.

In some embodiments, if the terminal device further needs to receive signaling sent by the network device, the transceiver may further receive the signaling. In some embodiments, the signaling is used to indicate the first time unit set and/or the second time unit set. In some embodiments, the signaling is used to indicate the first time unit and/or the second time unit. In some embodiments, the signaling includes information used to indicate the first search space and/or the second search space.

According to this embodiment of the present invention, the first search space is in the first time unit, and the second search space is in the second time unit. The first time unit and the second time unit respectively belong to the first time unit set and the second time unit set, but the first time unit set and the second time unit set partially or completely overlap, so that the terminal device can detect, in different search spaces, DCI used to schedule different data transmission, to support data transmission having a plurality of TTI lengths or data transmission having a plurality of scheduling priorities. Further, if the second time unit set is a proper subset of the first time unit set, the network device may send the second DCI at lower frequency than the first DCI, and frequency that the terminal device determines the second search space and detects the second DCI can be reduced, thereby reducing processing complexity.

Figure 8:
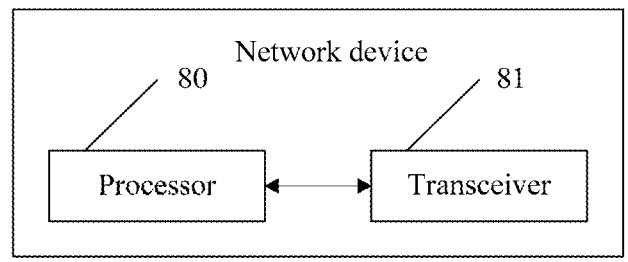
FIG. 8 is a schematic diagram of a second example according to an embodiment of the present invention.

FIG. 8 is a schematic structural diagram of a network device according to an embodiment of the present invention. It should be noted that the device may be configured to perform the method in the foregoing embodiment. Therefore, for content that is the same as content of the foregoing embodiment, refer to the descriptions in the foregoing embodiment, and details are not described subsequently again.

The device in this embodiment may include a processor and a transceiver. The processor is in communication connection with the transceiver. Certainly, the device may further include a memory and the like. For example, the memory may store a pre-determined sequence, and may further store a pre-determined rule, and the like.

The processor is configured to determine at least one of a first search space and a second search space, where the first search space is in a first time unit within a time window T, the first time unit belongs to a first time unit set, the second search space is in a second time unit within the time window T, the second time unit belongs to a second time unit set, the time window T includes $N_T$ time units, the first time unit set and the second time unit set are subsets of the $N_T$ time units, $N_T$ is an integer greater than or equal to 2, the first time unit set and the second time unit set partially or completely overlap, and the first time unit is the same as or different from the second time unit.

The transceiver is configured to send at least one piece of downlink control information DCI, where the DCI is located in the at least one search space.

In some embodiments, the processor of the network device may determine the first time unit and/or the second time unit from the first time unit set and/or the second time unit set, to determine the at least one of the first search space and the second search space in the first time unit and/or the second time unit. In the at least one search space determined by the processor, the transceiver of the network device sends DCI used to schedule data transmission.

In some embodiments, if the first time unit set and the second time unit set are predefined, the memory is further configured to store the first time unit set and the second time unit set.

In some embodiments, if the network device further needs to send signaling to a terminal device, the transceiver may further send the signaling. In some embodiments, the signaling is used to indicate the first time unit set and/or the second time unit set. In some embodiments, the signaling is used to indicate the first time unit and/or the second time unit. In some embodiments, the signaling includes information used to indicate the first search space and/or the second search space.

According to this embodiment of the present invention, the first search space is in the first time unit, and the second search space is in the second time unit. The first time unit and the second time unit respectively belong to the first time unit set and the second time unit set, but the first time unit set and the second time unit set partially or completely overlap, so that the network device can more flexibly determine a search space, and configure, to different search spaces, DCI used to schedule different data transmission, to support data transmission having a plurality of TTI lengths or data transmission having a plurality of scheduling priorities. Further, if the second time unit set is a proper subset of the first time unit set, the network device may send the second DCI at lower frequency than the first DCI, and frequency that the terminal device determines the second search space and detects the second DCI can be reduced, thereby reducing processing complexity. If the first time unit set and the second time unit set completely overlap, a chance of sending the second DCI can be increased, so that the network device can more flexibly configure and send the second DCI, thereby increasing a probability of successful scheduling by using the second DCI. It should be noted that the processor in all the foregoing embodiments of the present invention may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. In addition, the network device and the terminal device in the foregoing embodiments of the present invention may further include a component such as the memory. The memory herein may include a read-only memory and a random access memory, and provide an instruction and data for the processor. A part of the memory may further include a non-volatile random access memory. For example, the memory may further store device type information. The processor invokes instruction code in the memory, to control the network device and another module in user equipment that are in the embodiments of the present invention to perform the foregoing operations.

It should be understood that "an embodiment", "one embodiment", or "this embodiment of the present invention" mentioned in the whole specification means that particular features, structures, or characteristics related to the embodiments are included in at least one embodiment of the present invention. Therefore, "in an embodiment", "in one embodiment", or "in this embodiment of the present invention" in all parts of the whole specification does not necessarily refer to a same embodiment. In addition, these particular features, structures, or characteristics may be combined in one or more embodiments in any appropriate manner.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only, and B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use a different method to implement the described functions for each particular application, but it should not be considered that the implementation goes beyond the scope of the present invention.

In the several embodiments of this application, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A downlink control information (DCI) detection method applied to a downlink control channel, wherein the downlink control channel is a channel used to carry DCI, the DCI method comprising:
   determining, by a terminal device, at least one search space from a first search space and a second search space, wherein
      the first and second search spaces are sets of downlink control channel candidates,
      the first search space is in a first time unit within a time window T, the first time unit belonging to a first time unit set, and
      the second search space is in a second time unit within the time window T, the second time unit belonging to a second time unit set, wherein
      the time window T comprises $N_T$ time units,
      the first time unit set and the second time unit set are subsets of the $N_T$ time units, $N_T$ being an integer greater than or equal to 2,
      the first time unit set and the second time unit set partially or completely overlap, and
      the first time unit is the same as or different from the second time unit; and
   detecting, by the terminal device, at least one piece of downlink control information (DCI) in the at least one search space; and, wherein
   the first time unit set comprises a time unit i and a time unit j, wherein the time unit i and the time unit j are resource elements; and
   when the first time unit is the time unit i, the first search space occupies M resource elements, and when the first time unit is the time unit j, the first search space occupies N resource elements, wherein M and N are natural numbers, and M is not equal to N.

2. The method according to claim 1, wherein
   when the determined at least one search space is the first search space, the at least one piece of downlink control information comprises first DCI, and detecting, by the terminal device, at least one piece of DCI in the at least one search space comprises:
      detecting, by the terminal device, the first DCI in the first search space; and
   when the determined at least one search space is the second search space, the at least one piece of downlink control information comprises second DCI, and detecting, by the terminal device, at least one piece of DCI in the at least one search space comprises:
      detecting, by the terminal device, the second DCI in the second search space; and
   when the at least one search space comprises the first search space and the second search space, the at least one piece of downlink control information comprises first DCI and second DCI, and detecting, by the terminal device, at least one piece of DCI in the at least one search space comprises:
      detecting, by the terminal device, the first DCI in the first search space, and detecting the second DCI in the second search space, wherein
   the first DCI is for scheduling first data transmission, the second DCI is for scheduling second data transmission, and a first transmission time interval (TTI) length for the first data transmission is less than a second transmission time interval (TTI) length for the second data transmission.

3. The method according to claim 1, wherein when $N_T$=2, the first time unit set comprises time units 0 and 1, and the second time unit set comprises the time unit 0;
   when $N_T$=4, the first time unit set comprises time units 0, 1, 2, and 3, and the second time unit set comprises the time unit 0;
   when $N_T$=4, the first time unit set comprises time units 0, 1, 2, and 3, and the second time unit set comprises the time units 0 and 2;
   when $N_T$=6, the first time unit set comprises time units 0, 1, 2, 3, 4 and 5, and the second time unit set comprises the time units 0;
   when $N_T$=6, the first time unit set comprises time units 0, 1, 2, 3, 4 and 5, and the second time unit set comprises the time units 0 and 3;
   when $N_T$=6, the first time unit set comprises time units 0, 1, 2, 3, 4 and 5, and the second time unit set comprises the time units 0, 1, 2, 3, 4 and 5;
   when $N_T$=7, the first time unit set comprises time units 0, 1, 2, 3, 4, 5, and 6, and the second time unit set comprises the time unit 0;
   when $N_T$=7, the first time unit set comprises time units 0, 1, 2, 3, 4, 5, and 6, and the second time unit set comprises the time units 0 and 3 or comprises the time units 0 and 4; and
   when $N_T$=7, the first time unit set comprises time units 0, 1, 2, 3, 4, 5, and 6, the second time unit set comprises the time units 0, 2, 3, and 5, or the second time unit set comprises the time units 0, 1, 3, and 5, or the second time unit set comprises the time units 0, 1, 3, and 4, or the second time unit set comprises the time units 0, 2, 4, and 6.

4. Method according to claim 1, wherein the time window T is one subframe, and each of the $N_T$ time units comprises at least one symbol, wherein the at least one symbol is an uplink symbol or a downlink symbol; and
   a first transmission time interval (TTI) length and a second TTI length are two of 1 millisecond, 0.5 millisecond, a length of four symbols, a length of three symbols, a length of two symbols, and a length of one symbol.

5. The method according to claim 1, wherein the first time unit is the same as the second time unit, and the first search space and the second search space partially or completely overlap.

6. The method according to claim 2, further comprising:
   determining, by the terminal device, a third search space, wherein the third search space is in a third time unit within the time window T, and the third time unit belongs to the second time unit set; and
   detecting, by the terminal device, third DCI in the third search space, wherein second DCI detected in the second search space by the terminal device and the third DCI detected in the third search space by the terminal device are both used to schedule the second data transmission.

7. A downlink control information (DCI) sending method applied to a downlink control channel, wherein the downlink control channel is a channel used to carry DCI, the DCI method comprising:
- determining, by a network device, at least one search space from a first search space and a second search space, wherein
  - the first and second search spaces are sets of downlink control channel candidates,
  - the first search space is in a first time unit within a time window T, the first time unit belonging to a first time unit set, and
  - the second search space is in a second time unit within the time window T, the second time unit belonging to a second time unit set, wherein
    - the time window T comprises $N_T$ time units,
    - the first time unit set and the second time unit set are subsets of the $N_T$ time units, $N_T$ being an integer greater than or equal to 2,
    - the first time unit set and the second time unit set partially or completely overlap, and
    - the first time unit is the same as or different from the second time unit; and
- sending, by the network device, at least one piece of downlink control information (DCI), wherein the at least one piece of DCI is located in the at least one search space; and, wherein
- the first time unit set comprises a time unit i and a time unit j, wherein the time unit i and the time unit j are resource elements; and
- when the first time unit is the time unit i, the first search space occupies M resource elements, and when the first time unit is the time unit j, the first search space occupies N resource elements, wherein M and N are natural numbers, and M is not equal to N.

8. The method according to claim 7, wherein the at least one search space is the first search space, and the at least one piece of downlink control information comprises first DCI;
- when the determined at least one search space is the second search space, and the at least one piece of downlink control information comprises second DCI;
- when the at least one search space comprises the first search space and the second search space, and the at least one piece of downlink control information comprises first DCI and second DCI, wherein
  - the first DCI is located in the first search space, the second DCI is located in the second search space, the first DCI is for scheduling first data transmission, the second DCI is for scheduling second data transmission, and a first transmission time interval (TTI) length for the first data transmission is less than a second transmission time interval (TTI) length for the second data transmission.

9. The method according to claim 7, wherein when $N_T=2$, the first time unit set comprises time units 0 and 1, and the second time unit set comprises the time unit 0;
- when $N_T=4$, the first time unit set comprises time units 0, 1, 2, and 3, and the second time unit set comprises the time unit 0;
- when $N_T=4$, the first time unit set comprises time units 0, 1, 2, and 3, and the second time unit set comprises the time units 0 and 2;
- when $N_T=6$, the first time unit set comprises time units 0, 1, 2, 3, 4 and 5, and the second time unit set comprises the time units 0;
- when $N_T=6$, the first time unit set comprises time units 0, 1, 2, 3, 4 and 5, and the second time unit set comprises the time units 0 and 3;
- when $N_T=6$, the first time unit set comprises time units 0, 1, 2, 3, 4 and 5, and the second time unit set comprises the time units 0, 1, 2, 3, 4 and 5;
- when $N_T=7$, the first time unit set comprises time units 0, 1, 2, 3, 4, 5, and 6, and the second time unit set comprises the time unit 0;
- when $N_T=7$, the first time unit set comprises time units 0, 1, 2, 3, 4, 5, and 6, and the second time unit set comprises the time units 0 and 3 or comprises the time units 0 and 4; and
- when $N_T=7$, the first time unit set comprises time units 0, 1, 2, 3, 4, 5, and 6, the second time unit set comprises the time units 0, 2, 3, and 5, or the second time unit set comprises the time units 0, 1, 3, and 5, or the second time unit set comprises the time units 0, 1, 3, and 4, or the second time unit set comprises the time units 0, 2, 4, and 6.

10. The method according to claim 7, wherein the time window T is one subframe, and each of the $N_T$ time units comprises at least one symbol, wherein the at least one symbol is an uplink symbol or a downlink symbol; and
- a first transmission time interval (TTI) length and a second TTI length are two of 1 millisecond, 0.5 millisecond, a length of four symbols, a length of three symbols, a length of two symbols, and a length of one symbol.

11. The method according to claim 7, wherein the first time unit is the same as the second time unit, and the first search space and the second search space partially or completely overlap.

12. The method according to claim 8, further comprising:
- determining, by the network device, a third search space, wherein the third search space is in a third time unit within the time window T, and the third time unit belongs to the second time unit set; and
- sending, by the network device, third DCI in the third search space, wherein second DCI sent in the second search space by the network device and the third DCI sent in the third search space by the network device are both used to schedule the second data transmission.

13. The method according to claim 7, wherein the first search space is a search space detected by a first terminal device, and the second search space is a search space detected by a second terminal device.

14. A terminal device, comprising a processor and a transceiver, wherein the transceiver is in communication connection with the processor;
- the processor is configured to determine at least one of a first search space and a second search space, wherein
  - the first and second search spaces are sets of downlink control channel candidates,
  - the first search space is in a first time unit within a time window T, the first time unit belonging to a first time unit set,
  - the second search space is in a second time unit within the time window T, the second time unit belonging to a second time unit set,
  - the time window T comprises $N_T$ time units,
  - the first time unit set and the second time unit set are subsets of the $N_T$ time units $N_T$ being an integer greater than or equal to 2,
  - the first time unit set and the second time unit set partially or completely overlap, and the first time unit is the same as or different from the second time unit; and the processor is configured to detect at least one piece of downlink control information (DCI) in the at least one search space; and, wherein the first time unit set comprises a time unit i and a time unit j, wherein the time unit i and the time unit j are resource elements; and when the first time unit is the time unit i, the first search space occupies M resource elements, and when the first time unit is the time unit j, the first search space occupies N resource elements, wherein M and N are natural numbers, and M is not equal to N.

15. The terminal device according to claim 14, wherein when the determined at least one search space is the first search space, the at least one piece of downlink control information comprises first DCI, and the processor is configured to detect the first DCI in the first search space;

when the at least one search space is the second search space, the at least one piece of downlink control information comprises second DCI, and that the processor is configured to detect at least one piece of DCI in the at least one search space comprises: detecting the second DCI in the second search space; and when the at least one search space comprises the first search space and the second search space, the at least one piece of downlink control information comprises first DCI and second DCI, and that the processor is configured to detect at least one piece of DCI in the at least one search space comprises: detecting the first DCI in the first search space, and detecting the second DCI in the second search space, wherein the first DCI is for scheduling first data transmission, the second DCI is for scheduling second data transmission, and a first transmission time interval (TTI) length for the first data transmission is less than a second transmission time interval (TTI) length for the second data transmission.

16. The terminal device according to claim 14, wherein when $N_T=2$, the first time unit set comprises time units 0 and 1, and the second time unit set comprises the time unit 0;

when $N_T=4$, the first time unit set comprises time units 0, 1, 2, and 3, and the second time unit set comprises the time unit 0;

when $N_T=4$, the first time unit set comprises time units 0, 1, 2, and 3, and the second time unit set comprises the time units 0 and 2;

when $N_T=6$, the first time unit set comprises time units 0, 1, 2, 3, 4 and 5, and the second time unit set comprises the time units 0;

when $N_T=6$, the first time unit set comprises time units 0, 1, 2, 3, 4 and 5, and the second time unit set comprises the time units 0 and 3;

when $N_T=6$, the first time unit set comprises time units 0, 1, 2, 3, 4 and 5, and the second time unit set comprises the time units 0, 1, 2, 3, 4 and 5;

when $N_T=7$, the first time unit set comprises time units 0, 1, 2, 3, 4, 5, and 6, and the second time unit set comprises the time unit 0; or when $N_T=7$, the first time unit set comprises time units 0, 1, 2, 3, 4, 5, and 6, and the second time unit set comprises the time units 0 and 3 or comprises the time units 0 and 4;

when $N_T=7$, the first time unit set comprises time units 0, 1, 2, 3, 4, 5, and 6, and the second time unit set comprises the time units 0, 2, 3, and 5, or the second time unit set comprises the time units 0, 1, 3, and 5, or the second time unit set comprises the time units 0, 1, 3, and 4, or the second time unit set comprises the time units 0, 2, 4, and 6.

17. The terminal device according to claim 14, wherein the time window T is one subframe, and each of the $N_T$ time units comprises at least one symbol, wherein the at least one symbol is an uplink symbol or a downlink symbol; and a first transmission time interval (TTI) length and the second TTI length are two of 1 millisecond, 0.5 millisecond, a length of four symbols, a length of three symbols, a length of two symbols, and a length of one symbol.

* * * * *